(12) United States Patent
Yonemura

(10) Patent No.: US 12,531,447 B2
(45) Date of Patent: Jan. 20, 2026

(54) PERMANENT MAGNET EMBEDDED MOTOR AND PUMP DEVICE

(71) Applicant: MIKUNI CORPORATION, Tokyo (JP)

(72) Inventor: Kazuya Yonemura, Kanagawa (JP)

(73) Assignee: MIKUNI CORPORATION, Tokyo (JP)

( * ) Notice: Subject to any disclaimer, the term of this patent is extended or adjusted under 35 U.S.C. 154(b) by 0 days.

(21) Appl. No.: 18/760,006

(22) Filed: Jun. 30, 2024

(65) Prior Publication Data

US 2025/0096627 A1   Mar. 20, 2025

(30) Foreign Application Priority Data

Sep. 20, 2023   (JP) .................................. 2023-151918

(51) Int. Cl.
| | | |
|---|---|---|
| *H02K 1/27* | (2022.01) | |
| *F04C 11/00* | (2006.01) | |
| *H02K 1/16* | (2006.01) | |
| *H02K 5/04* | (2006.01) | |
| *H02K 7/14* | (2006.01) | |

(52) U.S. Cl.
CPC .............. *H02K 1/27* (2013.01); *F04C 11/008* (2013.01); *H02K 1/16* (2013.01); *H02K 5/04* (2013.01); *H02K 7/14* (2013.01); *F04C 2240/40* (2013.01)

(58) Field of Classification Search
CPC .... F04C 11/008; F04C 2/102; F04C 2240/40; H02K 1/16; H02K 1/185; H02K 1/27; H02K 2213/03; H02K 5/04; H02K 7/14
See application file for complete search history.

(56) References Cited

U.S. PATENT DOCUMENTS

| | | | | |
|---|---|---|---|---|
| 7,164,218 B2* | 1/2007 | Kimura | ................. | F04C 23/008 310/58 |
| 7,466,055 B2* | 12/2008 | Toide | ..................... | H02K 29/03 310/216.041 |
| 7,767,105 B2* | 8/2010 | Uetsuji | ................ | H02K 15/028 216/58 |
| 8,304,953 B2* | 11/2012 | Nakahara | ................ | H02K 1/16 310/58 |
| 10,498,180 B2* | 12/2019 | Liang | ...................... | C23C 26/00 |
| 12,009,709 B2* | 6/2024 | Murakawa | ........... | C21D 9/0068 |
| 2014/0167559 A1* | 6/2014 | Eike | ....................... | H02K 15/00 310/216.131 |
| 2020/0235617 A1* | 7/2020 | Tang | ........................ | B60K 1/04 |
| 2022/0247268 A1* | 8/2022 | Suzuki | .................. | H02K 29/03 |
| 2023/0075042 A1* | 3/2023 | Mikami | .................... | F04C 2/10 |

FOREIGN PATENT DOCUMENTS

JP   2022116563   8/2022

\* cited by examiner

*Primary Examiner* — Jesse S Bogue
(74) *Attorney, Agent, or Firm* — JCIPRNET

(57) ABSTRACT

A permanent magnet embedded motor includes: a stator, including a stator core and a coil for excitation, the stator core being formed in an annular shape by laminating a plurality of steel plates obtained by punching a rolled steel plate material; a rotor, arranged inside the stator and including a permanent magnet; and a housing, made of metal and including a fitting recess of a cylindrical shape centered on a predetermined axis for fitting the stator therein. The stator is shrink-fitted into the housing, with a rolling direction of the steel plate being oriented in an expansion direction in which an inner diameter of the fitting recess undergoes a large amount of change during heating of the housing.

14 Claims, 21 Drawing Sheets

PERMANENT MAGNET EMBEDDED MOTOR AND PUMP DEVICE

CROSS-REFERENCE TO RELATED APPLICATIONS

This application claims the priority benefit of Japan Application No. 2023-151918, filed on Sep. 20, 2023. The entirety of the above-mentioned patent application is hereby incorporated by reference herein and made a part of this specification.

BACKGROUND

Technical Field

The present disclosure relates to a permanent magnet embedded motor including a stator around which a coil is wound and a rotor in which a permanent magnet is embedded, and to a pump device using the permanent magnet embedded motor as a drive source.

Related Art

As a conventional permanent magnet embedded motor, there has been known a permanent magnet motor including: a stator, including a stator core of an annular shape having teeth and slots arranged in a circumferential direction and a coil wound around the teeth; a rotor, rotatably arranged inside the stator and having a permanent magnet inserted therein; and a housing, fixing the stator core and rotatably supporting the rotor (see, for example, Japanese Patent Laid-open No. 2022-116563).

In this permanent magnet motor, in order to reduce iron loss caused by eddy current loss, the stator core is formed by laminating a plurality of electromagnetic steel plates punched out from a thin electromagnetic steel plate material, and is fixed into the housing by shrink fitting or the like.

A fabricated steel billet (steel ingot) is subjected to rolling in a predetermined direction and to a heat treatment or the like as appropriate, and is formed into a strip-shaped steel plate material, and the electromagnetic steel plate material is provided as a roll material obtained by winding the strip-shaped steel plate material. In the case of forming a plurality of electromagnetic steel plates that serve as a base material of the stator core, the roll material is extended into a flat plate and subjected to punching while being progressively fed, and an electromagnetic steel plate of designed dimensions is fabricated.

However, due to residual strain caused by the rolling of the electromagnetic steel plate material, or machining error during extension and punching of the roll material as the electromagnetic steel plate material, or the like, when a plurality of electromagnetic steel plates obtained by punching are laminated to form the stator core, the size tends to be slightly larger than a designed value in a rolling direction. When machining precision is increased in order to address this issue, machining costs are increased.

In the above stator core, for example, when the housing is heated, expanded, and is fixed by shrink fitting, the housing may not have a constant thermal expansion rate depending on its shape and form, which may result in an area in the housing or the stator core where internal stress is locally increased after shrink fitting.

Accordingly, taking into consideration dimensional tolerances and geometric tolerances of the stator core and the housing, and dimensional error depending on the rolling of the electromagnetic steel plate and the roll material, it is desirable to suppress or prevent local stress or the like occurring in each component and to achieve a relatively reliable structure.

SUMMARY

A permanent magnet embedded motor of the present disclosure includes: a stator, including a stator core and a coil for excitation, the stator core being formed in an annular shape by laminating a plurality of steel plates obtained by punching a rolled steel plate material; a rotor, arranged inside the stator and including a permanent magnet; and a housing, made of metal and including a fitting recess of a cylindrical shape centered on a predetermined axis for fitting the stator therein. The stator is shrink-fitted into the housing, with a rolling direction of the steel plate being oriented in an expansion direction in which an inner diameter of the fitting recess undergoes a large amount of change during heating of the housing.

DESCRIPTION OF THE EMBODIMENTS

Figure 1:
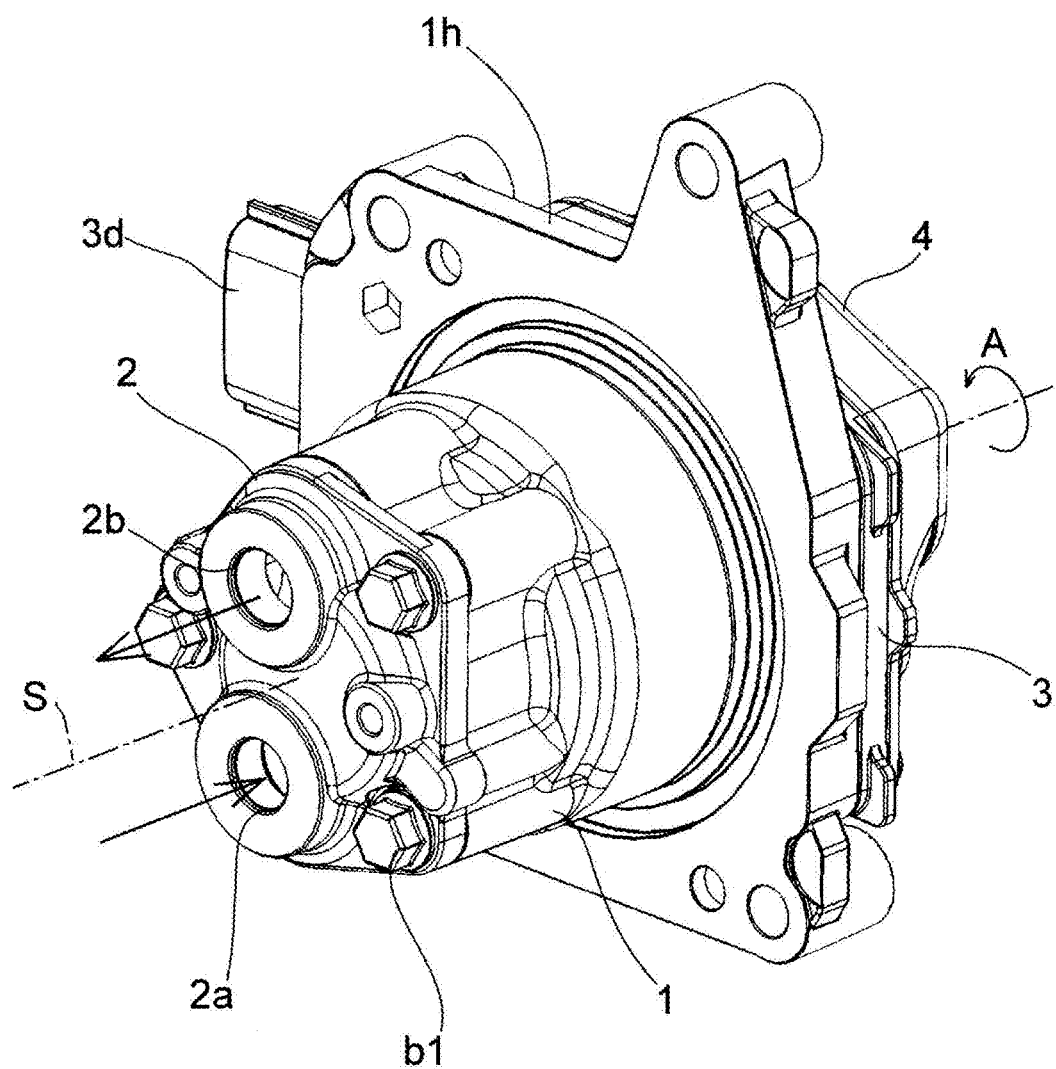
FIG. 1 is an external perspective view illustrating a pump device including a permanent magnet embedded motor according to the present disclosure.

The present disclosure provides a permanent magnet embedded motor in which the occurrence of local stress can be suppressed or prevented without increasing machining costs or increasing complexity and size of the structure of a housing, and a robust structure can be obtained, and to provide a pump device using the permanent magnet embedded motor as a drive source.

The permanent magnet embedded motor of the present disclosure includes: a stator, including a stator core and a coil for excitation, the stator core being formed in an annular shape by laminating a plurality of steel plates obtained by punching a rolled steel plate material; a rotor, arranged inside the stator and including a permanent magnet; and a housing, made of metal and including a fitting recess of a cylindrical shape centered on a predetermined axis for fitting the stator therein. The stator is shrink-fitted into the housing, with a rolling direction of the steel plate being oriented in an expansion direction in which an inner diameter of the fitting recess undergoes a large amount of change during heating of the housing.

In the above permanent magnet embedded motor, the housing may include a wall and a thick part, the wall defining the fitting recess, the thick part being formed continuous with a periphery of the wall and thicker than the wall on an opening side of the fitting recess. The expansion direction may match an angular position about the axis where a cross-sectional area of the thick part is largest in a cross section including the axis.

In the above permanent magnet embedded motor, the housing may include a wall and two thick parts, the wall defining the fitting recess, the two thick parts being formed continuously around the wall in an orthogonal line direction orthogonal to the axis on an opening side of the fitting recess and being thicker than the wall. The stator may be shrink-fitted into the housing, with the rolling direction being oriented in an arrangement direction of the two thick parts.

In the above permanent magnet embedded motor, the housing may include a wall, a flange, and two bosses, the wall defining the fitting recess, the flange being formed around the wall on an opening side of the fitting recess, the two bosses being arranged at the flange in an orthogonal line direction orthogonal to the axis and being thicker than the wall. The stator may be shrink-fitted into the housing, with the rolling direction being oriented in an arrangement direction of the two bosses.

In the above permanent magnet embedded motor including two bosses, the flange may be formed thicker than the wall.

In the above permanent magnet embedded motor including two bosses, the two bosses may be formed thicker than the flange.

In the above permanent magnet embedded motor including two bosses, the flange may include a plurality of lightening parts in an area outside an area through which the orthogonal line passes.

In the above permanent magnet embedded motor, the stator may include an indicator indicating the rolling direction.

In the above permanent magnet embedded motor, the steel plate may have a plate thickness of 0.2 mm to 0.5 mm.

In the above permanent magnet embedded motor, the housing may be made of an aluminum material.

In the above permanent magnet embedded motor, the stator core may include teeth and slots arranged in a circumferential direction. The stator may include the coil wound around the teeth via a bobbin made of resin.

In the above permanent magnet embedded motor, the rotor may include a rotor core of a columnar shape and the permanent magnets, the rotor core being formed by laminating a plurality of steel plates obtained by punching a rolled steel plate material and including insertion holes arranged in a circumferential direction, the permanent magnet being inserted into the insertion holes, respectively.

A pump device of the present disclosure includes: a pump unit, suctioning and discharging a fluid; a rotating shaft, connected to the pump unit; and a drive source, exerting a driving force on the rotating shaft. As the drive source, a permanent magnet embedded motor having any one of the above configurations is employed.

In the above pump device, the pump unit may be a trochoid pump including an inner rotor to which the rotating shaft is connected and an outer rotor engaged with the inner rotor.

According to the permanent magnet embedded motor having the above configuration, the occurrence of local stress (stress concentration) can be suppressed or prevented without increasing machining costs or increasing complexity and size of the structure of a housing, and a robust structure can be obtained. By using the permanent magnet embedded motor having the above configuration as a drive source, a highly reliable pump device can be obtained.

Hereinafter, an embodiment of the present disclosure will be described with reference to the accompanying drawings.

Figure 2:
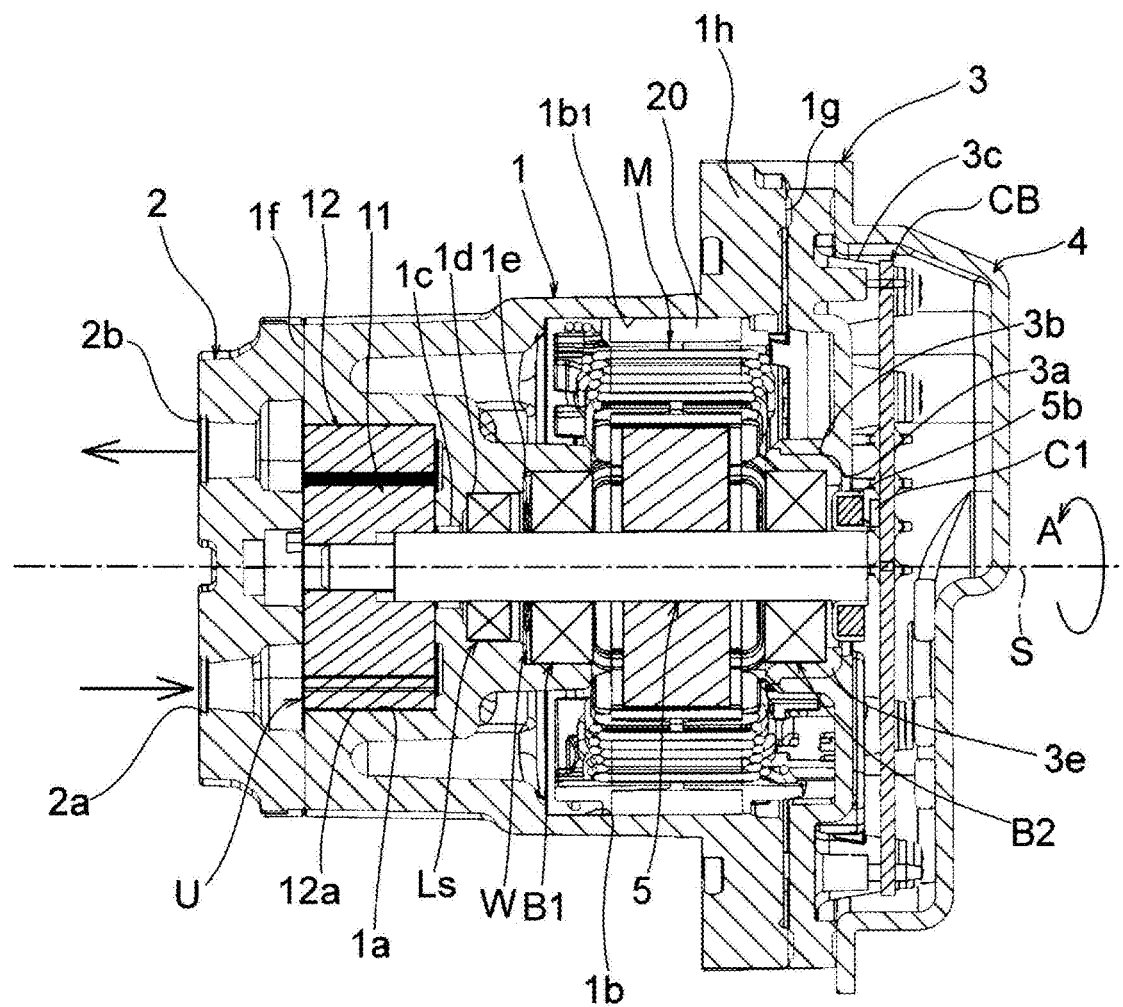
FIG. 2 is a cross-sectional view of the pump device illustrated in FIG. 1.
Figure 3:
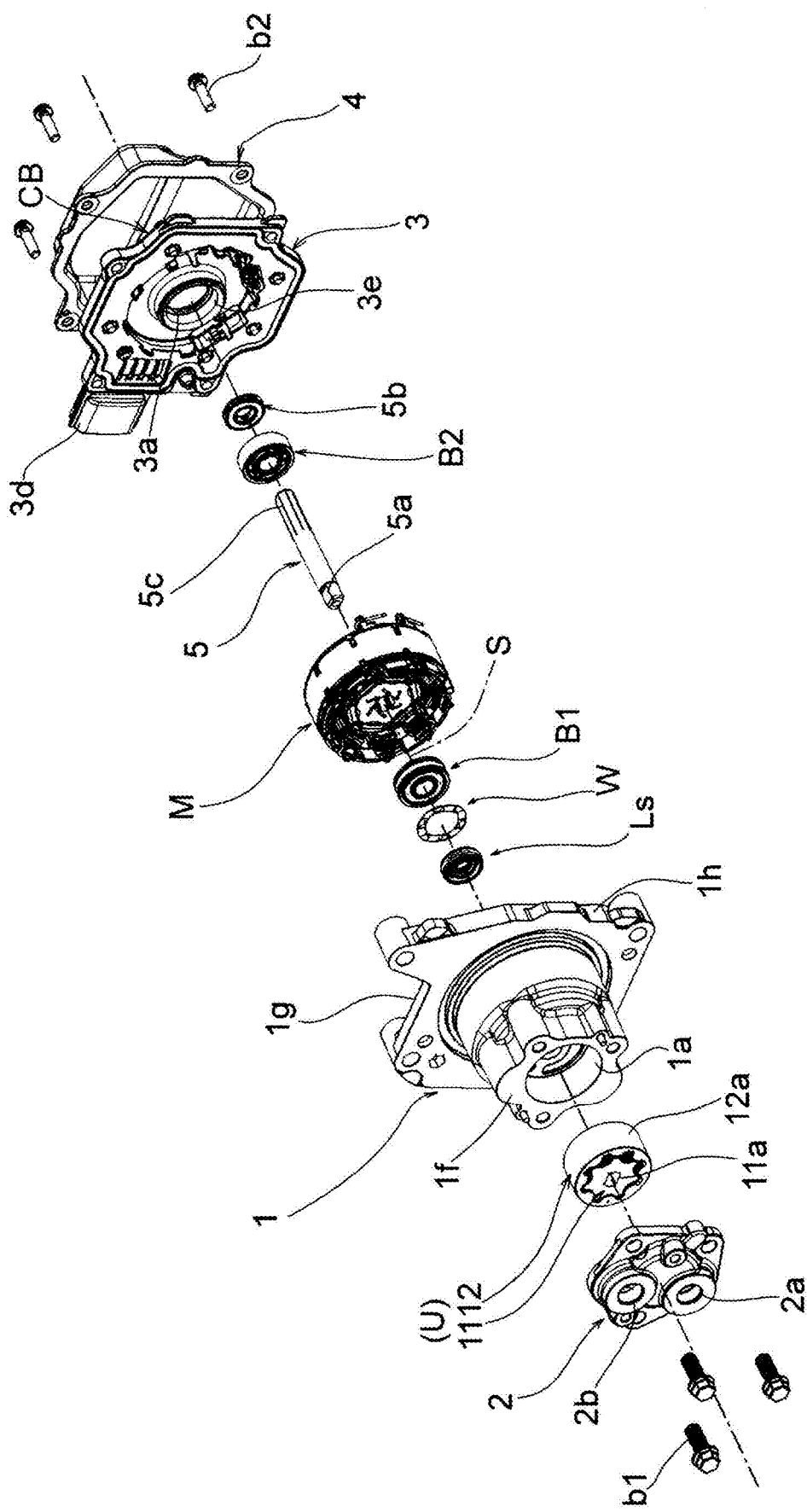
FIG. 3 is an exploded perspective view of the pump device illustrated in FIG. 1.
Figure 4:
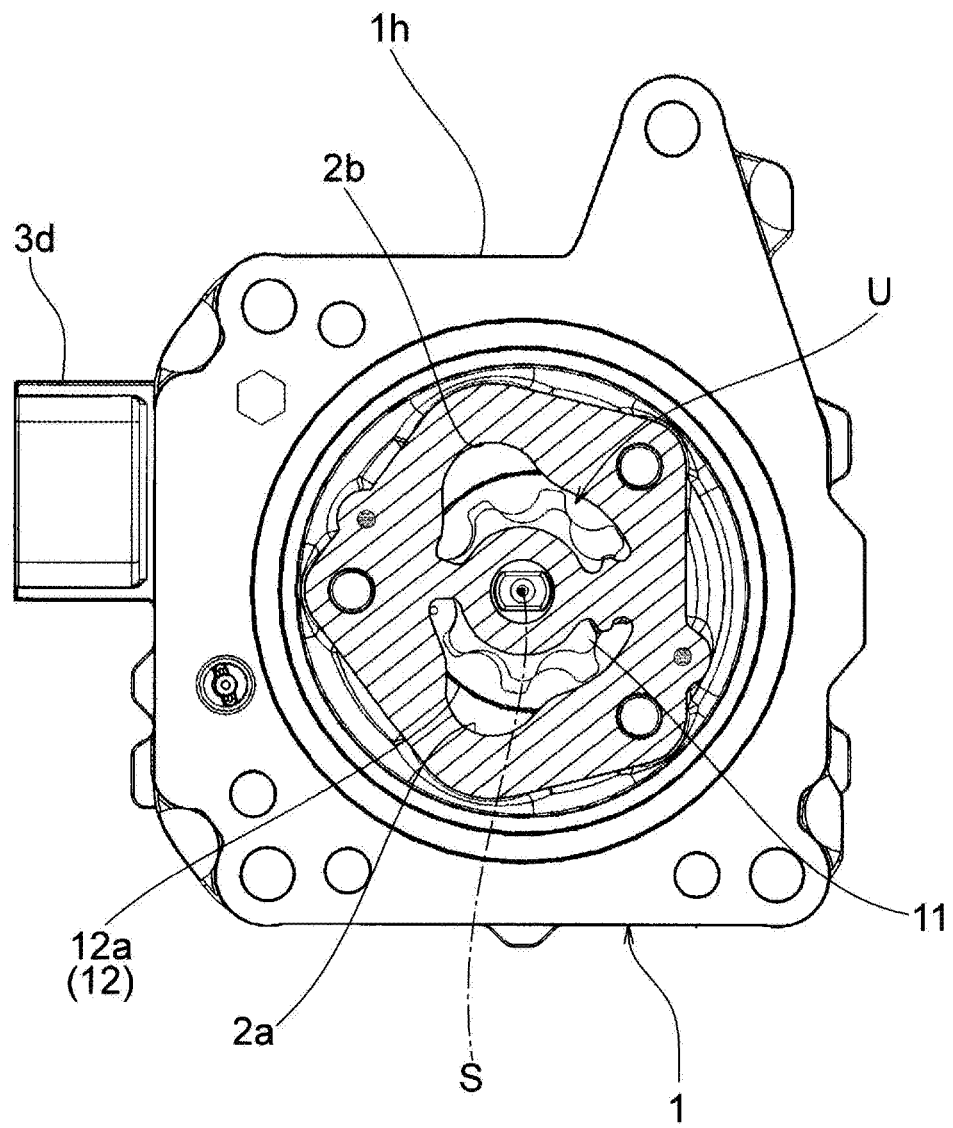
FIG. 4 is a cross-sectional view illustrating a suction port and a discharge port for a fluid in the pump device illustrated in FIG. 1, taken along a plane perpendicular to an axis which is a center line of rotation of a rotor.

As illustrated in FIG. 1 to FIG. 3, a pump device including a permanent magnet embedded motor according to one embodiment includes a housing body 1, a pump cover 2, a motor cover 3, a board cover 4, a rotating shaft 5, a pump unit U, a permanent magnet embedded motor M as a drive source, a circuit board CB, and so on.

The pump unit U is a trochoid pump that suctions and discharges a fluid (here, oil) and includes an inner rotor 11 and an outer rotor 12.

Figure 8:
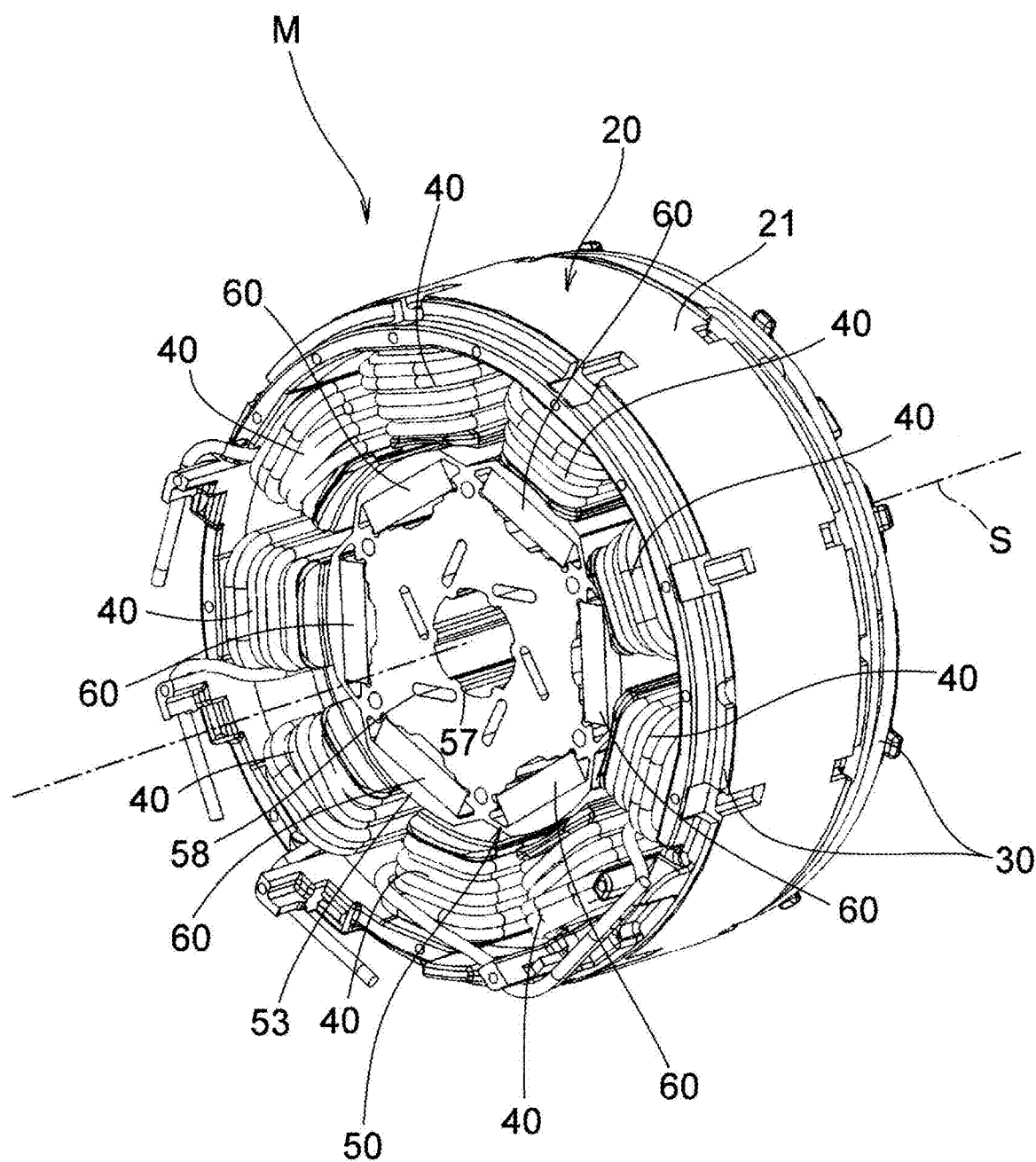
FIG. 8 is an external perspective view illustrating the permanent magnet embedded motor as a drive source included in the pump device illustrated in FIG. 1.
Figure 9:
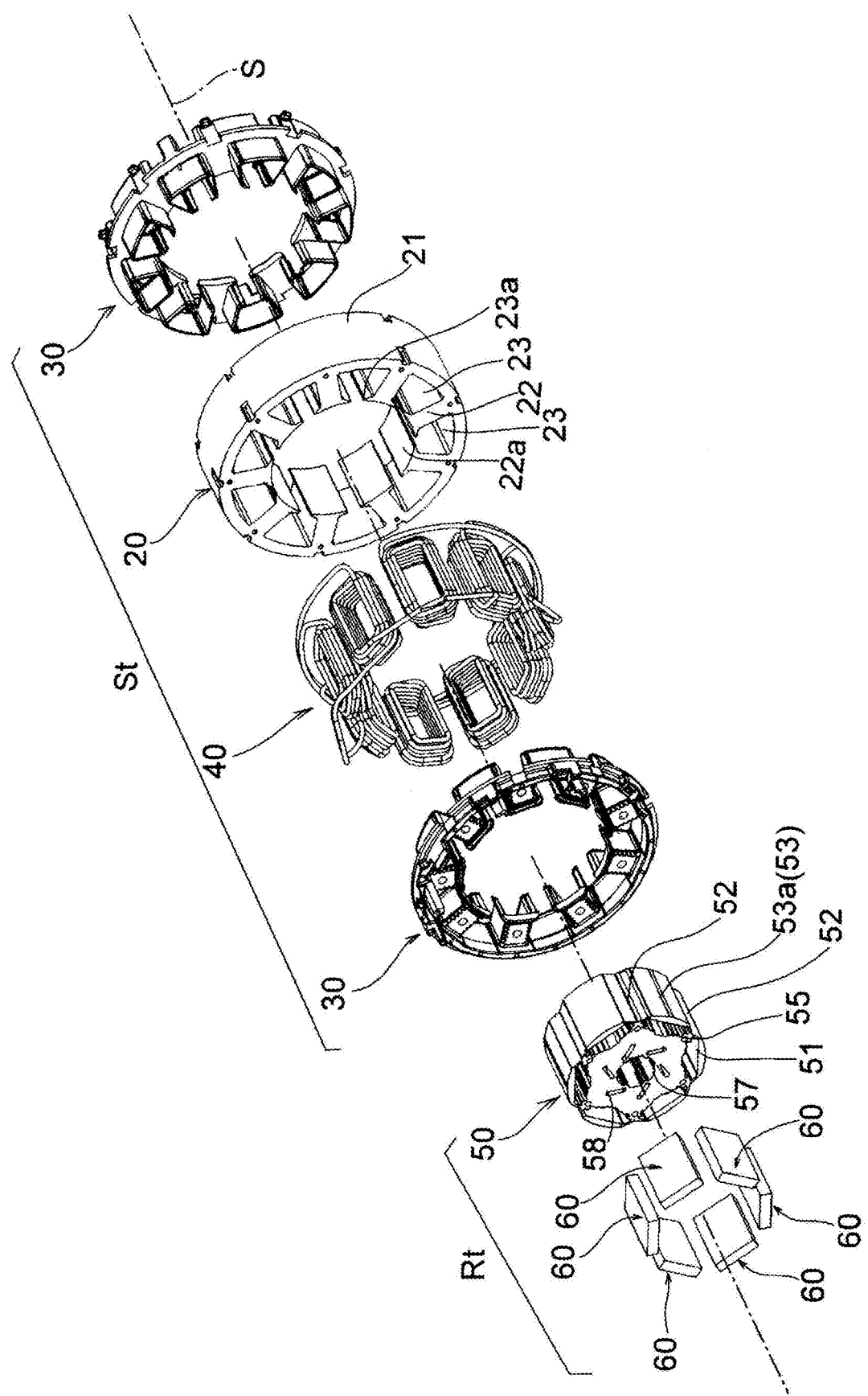
FIG. 9 is an exploded perspective view of the permanent magnet embedded motor illustrated in FIG. 8.

As illustrated in FIG. 2, FIG. 8 and FIG. 9, the permanent magnet embedded motor M includes: a stator St, including a stator core 20, a bobbin 30, and a coil 40; a rotor Rt, including a rotor core 50 and a permanent magnet 60; and a housing (housing body 1, motor cover 3), and is a three-phase brushless motor including nine slots and six magnetic poles.

Here, the housing body 1 and the motor cover 3, while being portions of the housing of the pump device, function as the housing of the permanent magnet embedded motor M, fix the stator St, and rotatably support the rotor Rt.

The housing body 1 is made of a metal material, for example, an aluminum material. As illustrated in FIG. 2, FIG. 3, and FIG. 5 to FIG. 7, the housing body 1 includes: an accommodation recess 1*a* that accommodates the pump unit U, a fitting recess 1*b* that allows the stator St to be fitted and accommodated therein, a wall 1*b*$_2$ that defines the fitting recess 1*b*, a communication path 1*c* that communicates the accommodation recess 1*a* with the fitting recess 1*b*, an annular recess 1*d*, an annular recess 1*e*, an end face 1*f*, an end face 1*g*, a flange 1*h*, four bosses 1*j*$_1$, 1*j*$_2$, 1*j*$_3$, 1*j*$_4$, a plurality of lightening parts 1*k*, and four screw holes 1*m* into which a screw b2 that fastens the board cover 4 and the motor cover 3 is screwed.

The accommodation recess 1*a* defines an inner peripheral surface and a bottom surface of a cylindrical shape in order to rotatably accommodate the pump unit U.

The fitting recess 1*b* is formed in a cylindrical shape centered on an axis S being a center of rotation of the rotor Rt, and includes a fitting surface 1*b*$_1$ into which an annular part 21 of the stator core 20 is fitted.

Figure 7:
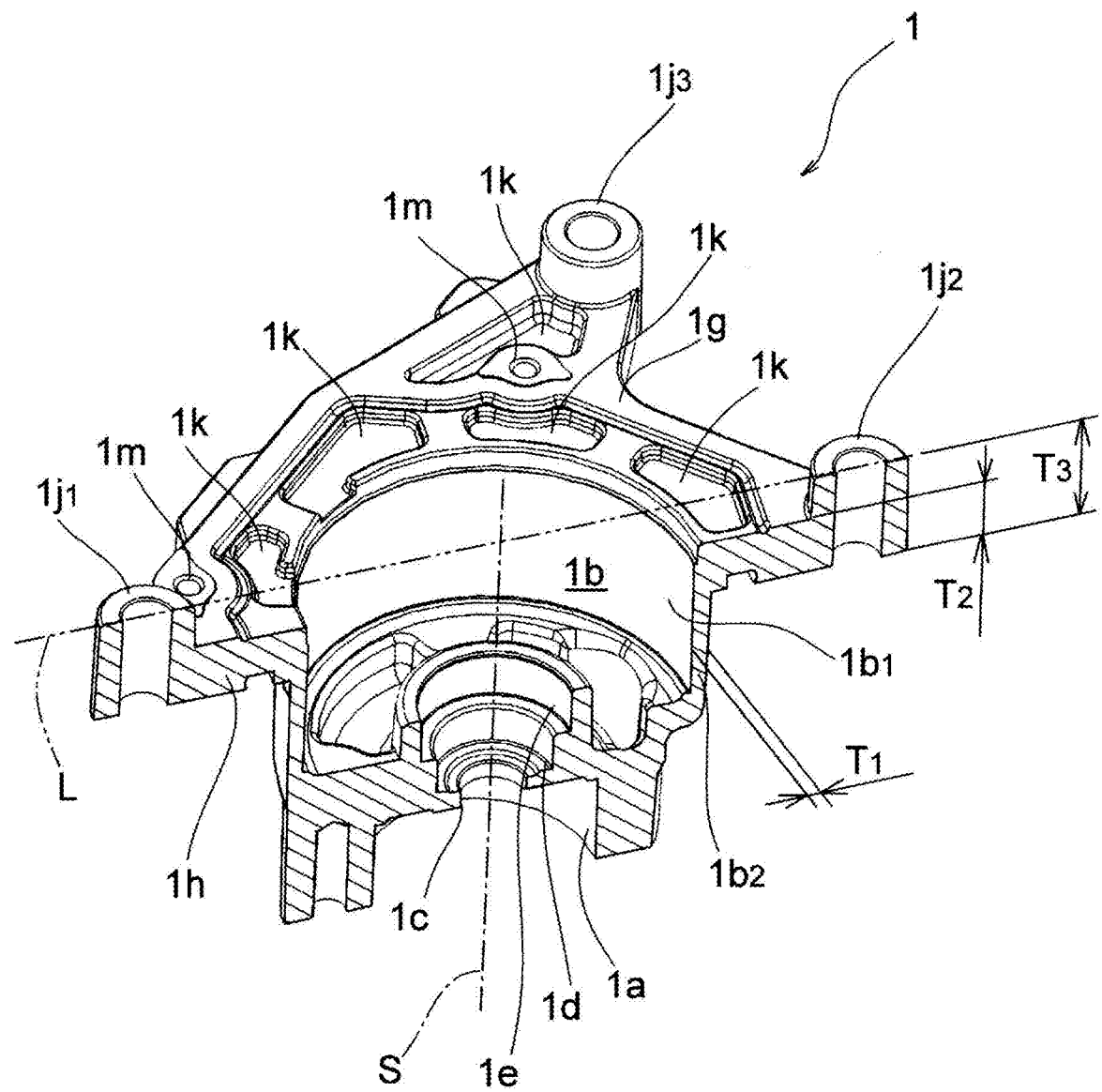
FIG. 7 is a perspective cross-sectional view of the housing body taken along line X-X in FIG. 6.

The wall 1*b*$_2$ is formed in a cylindrical shape centered on the axis S in order to define the fitting recess 1*b*. As illustrated in FIG. 7, a wall thickness T$_1$ of the wall 1*b*$_2$ is smaller than a plate thickness T$_2$ of the flange 1*h*.

The communication path 1*c* is formed in a cylindrical shape centered on the axis S, and the rotating shaft 5 is inserted through the communication path 1*c* with a predetermined gap therebetween.

The annular recess 1*d* is formed in an annular shape centered on the axis S in order for a lip type seal Ls to be fitted therein.

The annular recess 1*e* is formed in an annular shape centered on the axis S in order for a bearing B1 to be fitted therein, the bearing B1 allowing a washer W to be interposed between itself and the lip type seal Ls and rotatably supporting the rotating shaft 5.

The end face 1*f* is formed as a flat surface perpendicular to the axis S in order for the pump cover 2 to be joined thereto.

The end face 1*g* is formed as a flat surface perpendicular to the axis S in order for the motor cover 3 to be closely joined thereto with a seal material sandwiched therebetween.

The flange 1*h* joins the pump device to an attachment surface of an application object, and fixes the pump device thereto by fastening. The flange 1*h* is formed in a substantially rectangular flat plate shape extending continuously around the wall 1*b*$_2$ in a direction perpendicular to the axis S on an opening side of the fitting recess 1*b*. The flange 1*h* overall is formed thicker than the wall 1*b*$_2$ of the fitting recess 1*b*. As illustrated in FIG. 7, the plate thickness T$_2$ in a direction in which two bosses 1*j*$_1$ and 1*j*$_2$ are aligned, that is, an orthogonal line L direction orthogonal to the axis S, is larger than the wall thickness T$_1$ of the wall 1*b*$_2$ that defines the fitting recess 1*b* (T$_2$>T$_1$).

In the flange 1*h*, a plurality of lightening parts 1*k* are provided in an area outside an area through which the orthogonal line L passes. By the plurality of lightening parts 1*k*, the housing body 1 can be reduced in weight while necessary mechanical strength is ensured.

In an area of a straight line connecting two bosses 1*j*$_3$ and 1*j*$_4$, the lightening part 1*k* is provided between each of the bosses 1*j*3 and 1*j*4 and the fitting recess 1*b*. A plate thickness of the flange 1*h* in this area is smaller than the plate thickness T$_2$.

The four bosses 1*j*$_1$, 1*j*$_2$, 1*j*$_3$, and 1*j*$_4$ allow a fastening bolt (not illustrated) to pass therethrough and be fastened in a state in which the pump device is joined to a joint surface of the application object through the flange 1*h*. As illustrated in FIG. 7, the four bosses 1*j*$_1$, 1*j*$_2$, 1*j*$_3$, and 1*j*$_4$ are formed in a cylindrical shape having a boss height (thickness) T$_3$.

That is, the four bosses 1*j*$_1$, 1*j*$_2$, 1*j*$_3$, and 1*j*$_4$ are formed thicker than the flange 1*h* (T$_3$>T$_2$).

The housing body 1 having the above configuration is heated to a predetermined temperature when the stator St is shrink-fitted into the fitting recess 1*b*. In this heating process, the housing body 1 thermally expands, and the amount of expansion is larger in an area having a large volume of material, that is, an area including a thick part, than in other areas. In the housing body 1, an overall thickness dimension (T$_2$, T$_3$) in an arrangement direction (orthogonal line L direction) of the two bosses 1*j*$_1$ and 1*j*$_2$ is larger than the wall thickness T$_1$ of the wall 1*b*$_2$ that defines the fitting recess 1*b* (T$_2$, T$_3$>T$_1$). An overall thickness dimension in the arrangement direction of the two bosses 1*j*$_3$ and 1*j*$_4$ is larger than the wall thickness T$_1$ of the wall 1*b*$_2$ that defines the fitting recess 1*b*, and is smaller than the thickness dimension in the arrangement direction of the two bosses 1*j*$_1$ and 1*j*$_2$.

That is, in the configuration in which the housing body 1 includes the wall 1*b*$_2$ that defines the fitting recess 1*b* and the thick part (flange 1*h*, four bosses 1*j*$_1$, 1*j*$_2$, 1*j*$_3$, and 1*j*$_4$, and lightening parts 1*k*) that is formed continuous with a periphery of the wall 1*b*$_2$ and thicker than the wall 1*b*$_2$ on the opening side of the fitting recess 1*b*, the cross-sectional area of the thick part in a cross section including the axis S is largest at an angular position illustrated in FIG. 7.

Accordingly, when the housing body 1 is heated, the amount of change Δd1 in an inner diameter of the fitting recess 1*b* in the arrangement direction of the bosses 1*j*$_1$ and 1*j*$_2$ as two thick parts is larger than the amount of change Δd2 in the inner diameter of the fitting recess 1*b* in the arrangement direction of the bosses 1*j*$_3$ and 1*j*$_4$ as two thick parts. The value of Δd (=Δd1−Δd2) is in the range of several μm.

Figure 5:
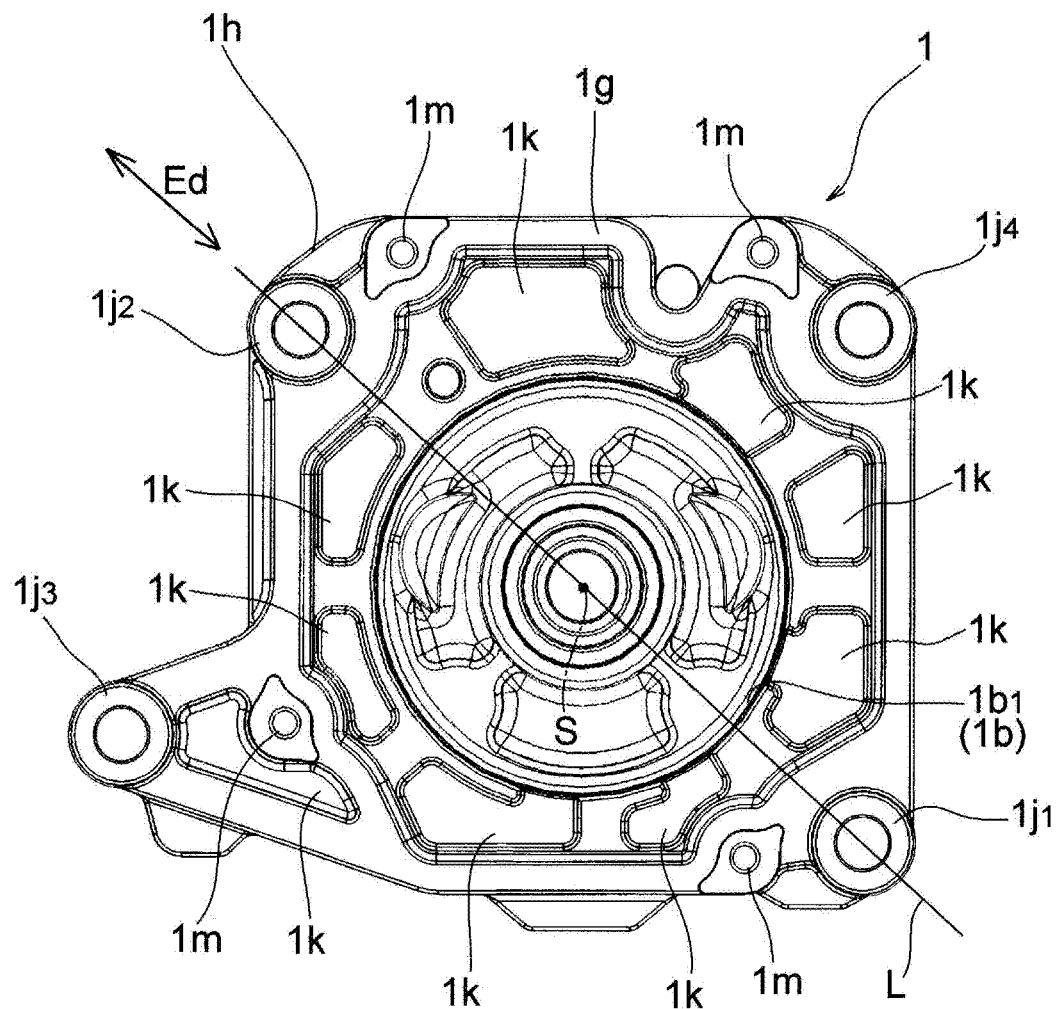
FIG. 5 is a plan view illustrating a housing body constituting a portion of a housing included in the pump device illustrated in FIG. 1.
Figure 6:
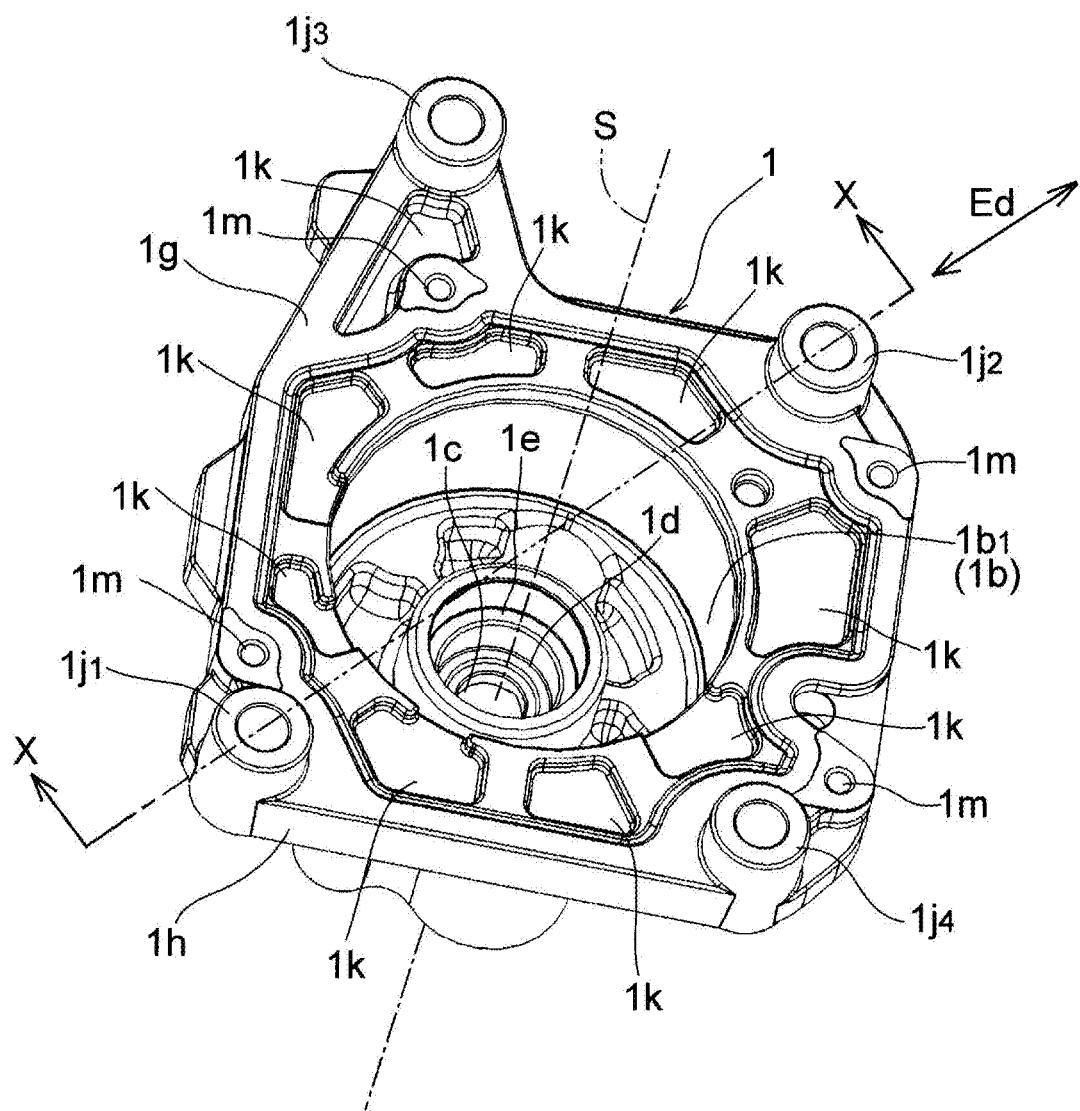
FIG. 6 is an external perspective view of the housing body illustrated in FIG. 5.

That is, as illustrated in FIG. 5, the arrangement direction of the bosses 1*j*$_1$ and 1*j*$_2$ as two thick parts corresponds to an expansion direction Ed in which the inner diameter of the fitting recess 1*b* undergoes a large amount of change during heating of the housing body 1. In other words, the expansion direction Ed in which the inner diameter of the fitting recess 1*b* undergoes a large amount of change during heating of the housing body 1 matches an angular position about the axis S where the cross-sectional area of the thick part is largest in the cross section including the axis S.

The pump cover 2 is made of an aluminum material or the like. As illustrated in FIG. 2 and FIG. 3, the pump cover 2 is joined to the end face 1*f* of the housing body 1 and covers the accommodation recess 1*a*, and includes a suction port 2*a* that suctions a fluid and a discharge port 2*b* that discharges a pressurized fluid.

With the pump unit U accommodated in the accommodation recess 1*a*, the pump cover 2 is joined to the end face 1*f* of the housing body 1 and is fastened and fixed by a screw b1.

The motor cover 3 is made of a resin material, is joined to the end face 1*g* of the housing body 1 and covers the fitting recess 1*b*. As illustrated in FIG. 2 and FIG. 3, the motor cover 3 includes a through hole 3*a* centered on the axis S, an annular recess 3*b*, a fixing part 3*c* that fixes the circuit board CB, a connector 3*d* that accommodates a terminal connecting to the outside, and a circular hole that allows the screw b2 to pass therethrough.

The through hole 3a is formed so as to allow insertion of a detected unit 5b fixed to an end of the rotating shaft 5 therethrough.

The annular recess 3b is formed in an annular shape centered on the axis S in order for a holder 3e of a cylindrical shape and made of metal to be fitted and fixed therein. The holder 3e made of metal allows a bearing B2 to be fitted thereto and holds the bearing B2, the bearing B2 rotatably supporting the rotating shaft 5.

The motor cover 3 is joined to the end face 1g of the housing body 1, and has the board cover 4 joined thereto from the outside. The motor cover 3 is fixed between the end face 1g and the board cover 4 by being fastened with the screw b2.

The board cover 4 is made of a metal plate, a resin material, or the like. In a state of enclosing the motor cover 3 in order to cover the circuit board CB, the board cover 4 is fastened and fixed to the end face 1g of the housing body 1 by the screw b2.

Figure 16:
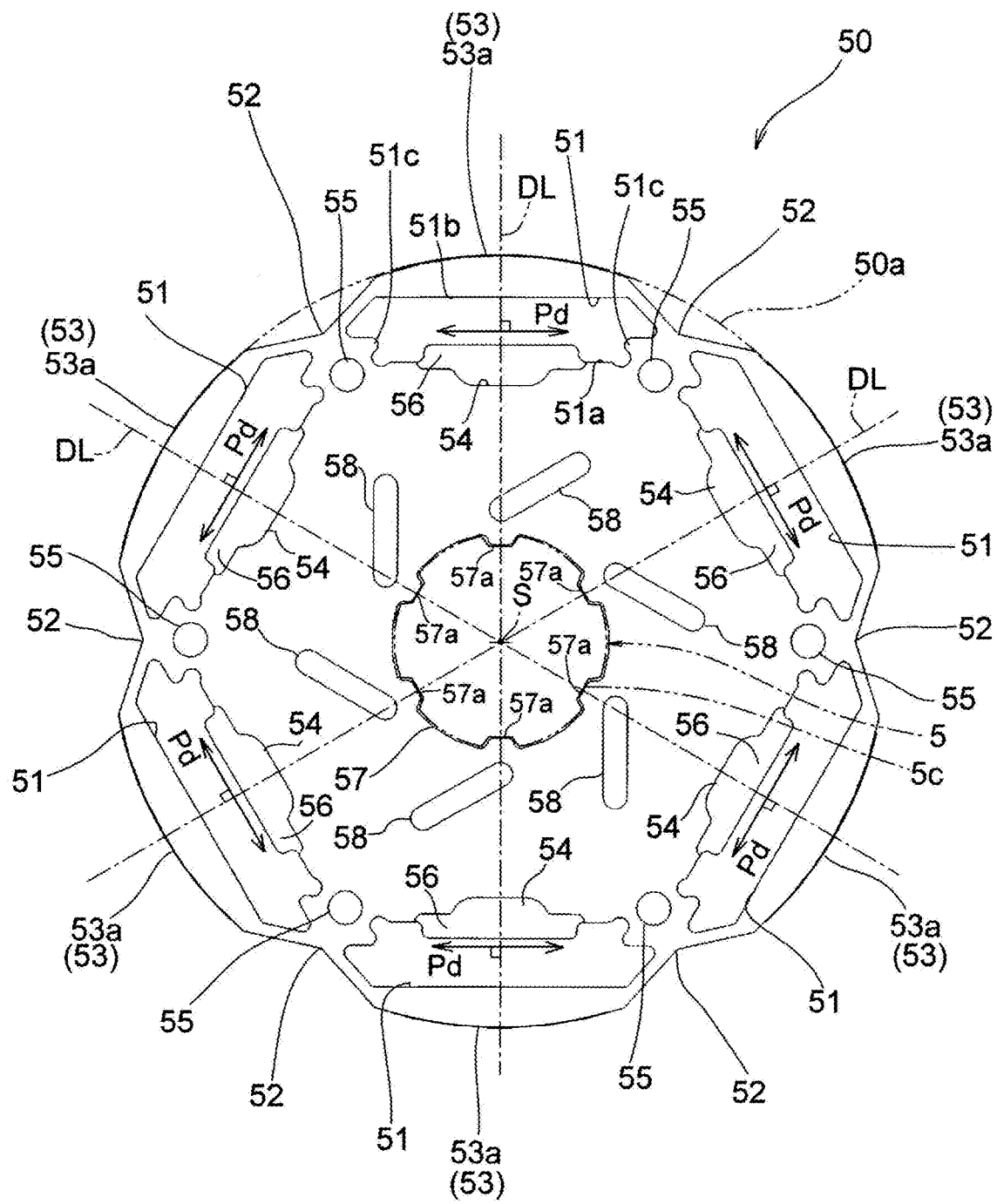
FIG. 16 is a plan view of a rotor core constituting a portion of the permanent magnet embedded motor, as viewed from one end side.

The rotating shaft 5 is made of a metal material and is formed in a columnar shape centered on the axis S. As illustrated in FIG. 2, FIG. 3, and FIG. 16, the rotating shaft 5 includes a connecting part 5a having width across flats on one end side, the detected unit 5b fixed on the other end side, and a key groove 5c on an outer periphery.

The rotating shaft 5 has the key groove 5c fitted into a shaft hole 57 of the rotor core 50 included in the permanent magnet embedded motor M, has the connecting part 5a connected to the inner rotor 11 of the pump unit U, has the outer periphery sealed by the lip type seal Ls, and is rotatably supported by the bearings B1 and B2, so as to transmit a rotational force of the rotor Rt to the inner rotor 11.

In the detected unit 5b, a permanent magnet is fitted into an annular holder so that the N pole and the S pole alternate around the axis S. As illustrated in FIG. 2, the detected unit 5b is arranged so as to face a detection sensor C1 mounted on the circuit board CB.

The detected unit 5b functions as a detection object of the detection sensor C1 that detects a rotational angle position of the rotating shaft 5, that is, the rotor Rt.

As illustrated in FIG. 2 and FIG. 3, the pump unit U includes the inner rotor 11 and the outer rotor 12.

The inner rotor 11 is made of a material such as steel or sintered steel. The inner rotor 11 is formed in a substantially star-like shape that defines an end face that slides on a bottom wall surface of the accommodation recess 1a of the housing body 1 and an inner wall surface of the pump cover 2. The inner rotor 11 is formed as an outer gear including a fitting hole 11a, and a tooth profile formed by a trochoid curve including seven convex portions (mountains) and seven concave portions (valleys).

The fitting hole 11a is formed so that the connecting part 5a of the rotating shaft 5 can be fitted therein.

The inner rotor 11 is rotated in a direction of arrow A in FIG. 1 and FIG. 2 by the rotating shaft 5 with the axis S as the center of rotation.

The outer rotor 12 is made of a material such as steel or sintered steel. The outer rotor 12 is formed in an annular shape that defines an end face that slides on the bottom wall surface of the accommodation recess 1a of the housing body 1 and the inner wall surface of the pump cover 2. The outer rotor 12 is formed as an inner gear including an outer peripheral surface 12a of a circular shape and eight convex portions and eight concave portions and having a tooth profile that may be engaged with the inner rotor 11.

The outer peripheral surface 12a contacts an inner peripheral surface of the accommodation recess 1a and is supported to be rotatable about an axis deviating from the axis S.

In conjunction with rotation of the inner rotor 11 rotating about the axis S, the outer rotor 12 rotates at a slower speed than the inner rotor 11.

By rotation of the inner rotor 11 and the outer rotor 12, the fluid may be suctioned into a pump chamber from the suction port 2a, and be discharged from the discharge port 2b while being pressurized.

The circuit board CB includes a component that controls driving of the permanent magnet embedded motor M. On the circuit board CB, wiring is printed, and various electronic components constituting a control circuit are mounted. As illustrated in FIG. 2, the detection sensor C1 facing the detected unit 5b is mounted on the circuit board CB.

The detection sensor C1 includes a plurality of Hall elements arranged in an arc shape centered on the axis S. The detection sensor C1 may detect a magnetic pole position (rotational angle position) in a rotation direction of the rotating shaft 5, that is, the rotor Rt.

As illustrated in FIG. 8 and FIG. 9, the permanent magnet embedded motor M includes: the stator St, including the stator core 20, the bobbin 30, and the coil 40; and the rotor Rt, including the rotor core 50 and the permanent magnet 60.

Figure 11:
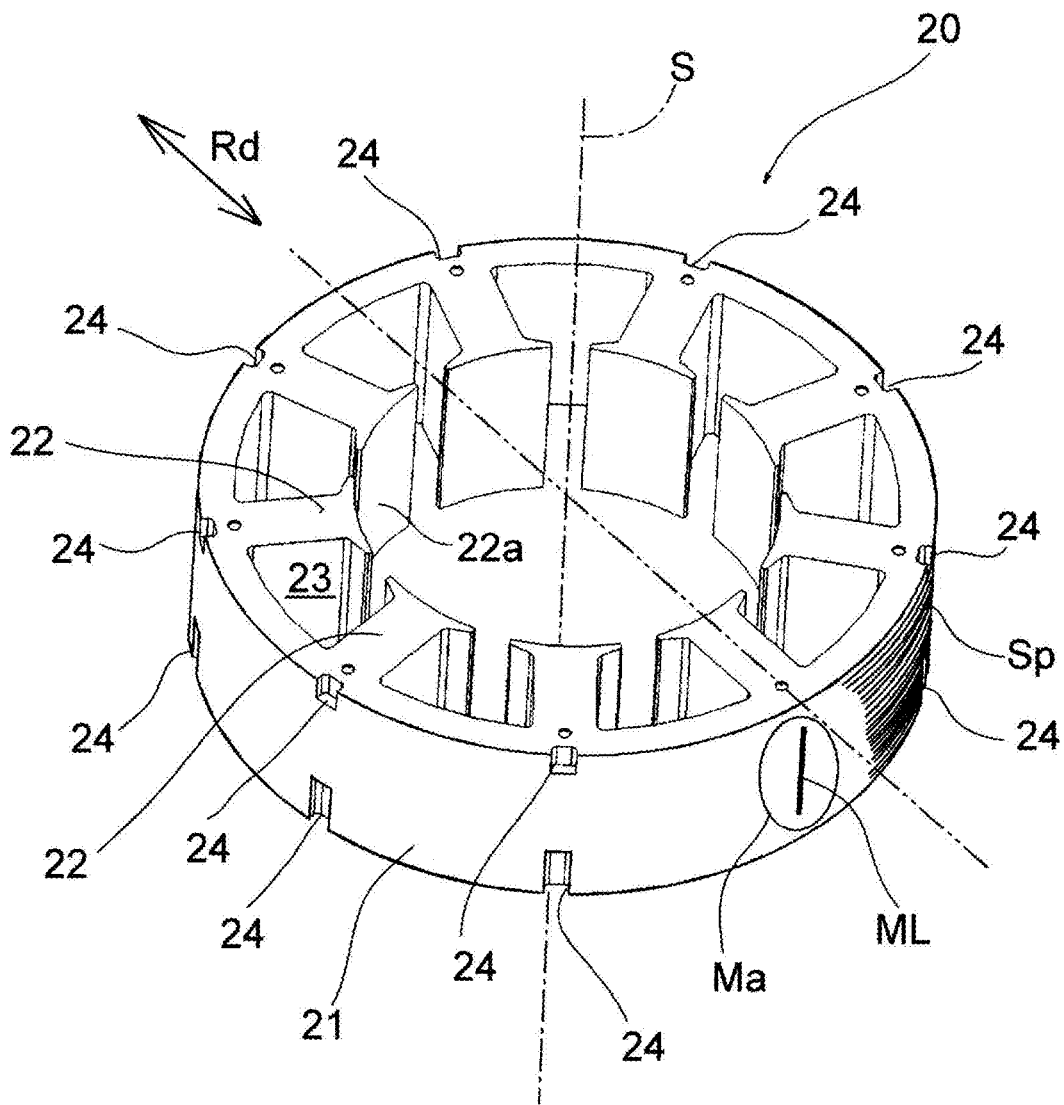
FIG. 11 an external perspective view illustrating a stator core constituting a portion of the permanent magnet embedded motor illustrated in FIG. 8.
Figure 12:
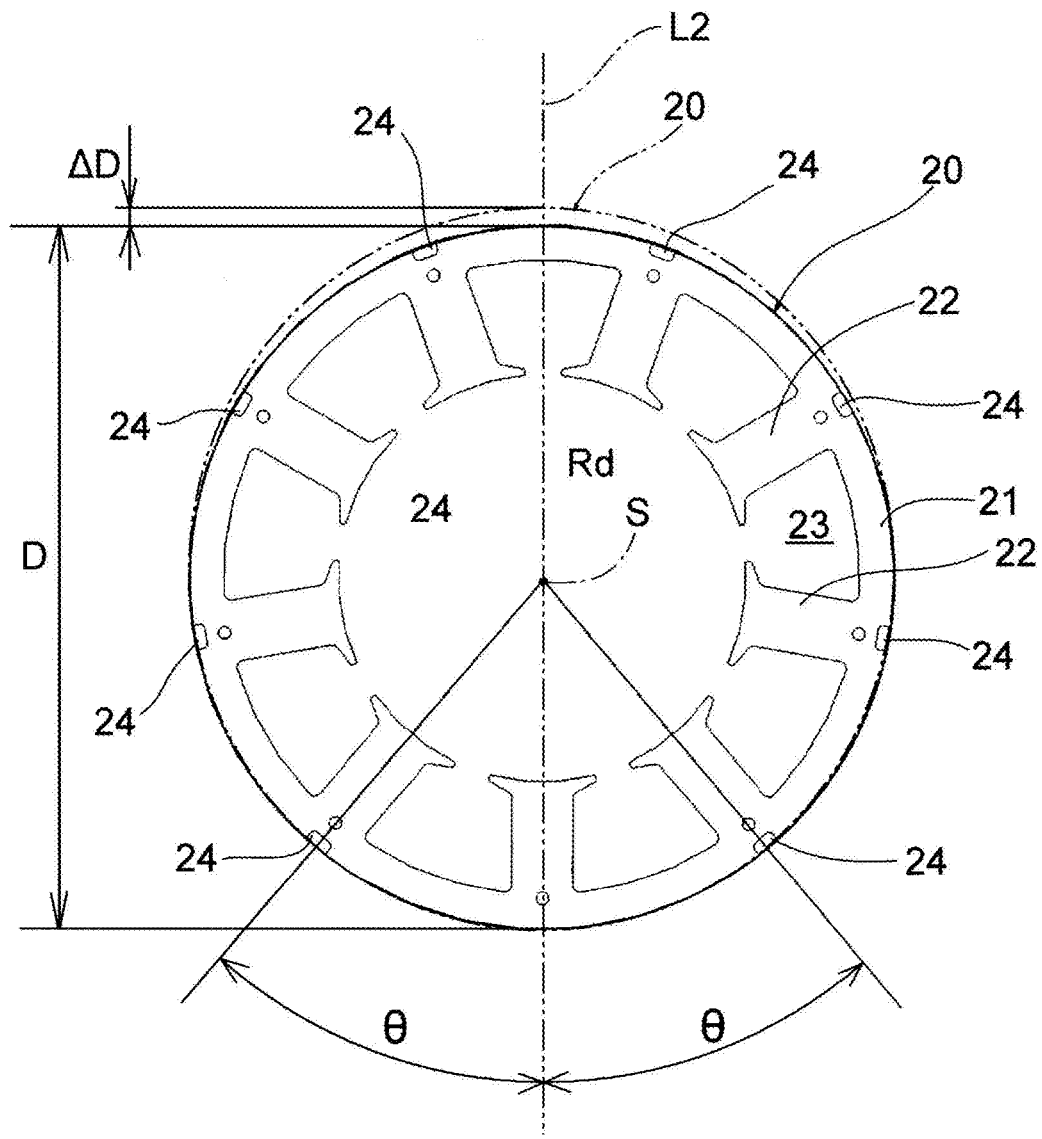
FIG. 12 is a plan view of the stator core illustrated in FIG. 11, as viewed from one end side.

The stator core 20 is formed as a laminate of a plurality of steel plates obtained by punching a rolled steel plate material made of a magnetic material. As illustrated in FIG. 11 and FIG. 12, the stator core 20 includes: an annular part 21; nine teeth 22 as salient poles protruding from the annular part 21 toward the center (axis S) and arranged at equal intervals in the circumferential direction; nine slots 23 arranged at equal intervals in the circumferential direction; and a plurality of notches 24.

The nine teeth 22 are formed in the same shape rotationally symmetrical about the axis S and each include a tip surface 22a that defines a circular arc surface.

The nine tip surfaces 22a are arranged on a cylindrical surface having a predetermined diameter, and are arranged so as to face an outer peripheral contour 50a (outer peripheral magnetic pole surface 53a) of the rotor core 50 with a predetermined gap therebetween.

The nine slots 23 are formed in the same shape rotationally symmetrical about the axis S and each include an opening 23a of a predetermined width between the teeth 22 on both sides.

The notch 24 is used when the stator core 20 is subjected to lamination pressing or positioned with respect to other components, or is used as an indicator thereof.

Figure 13:
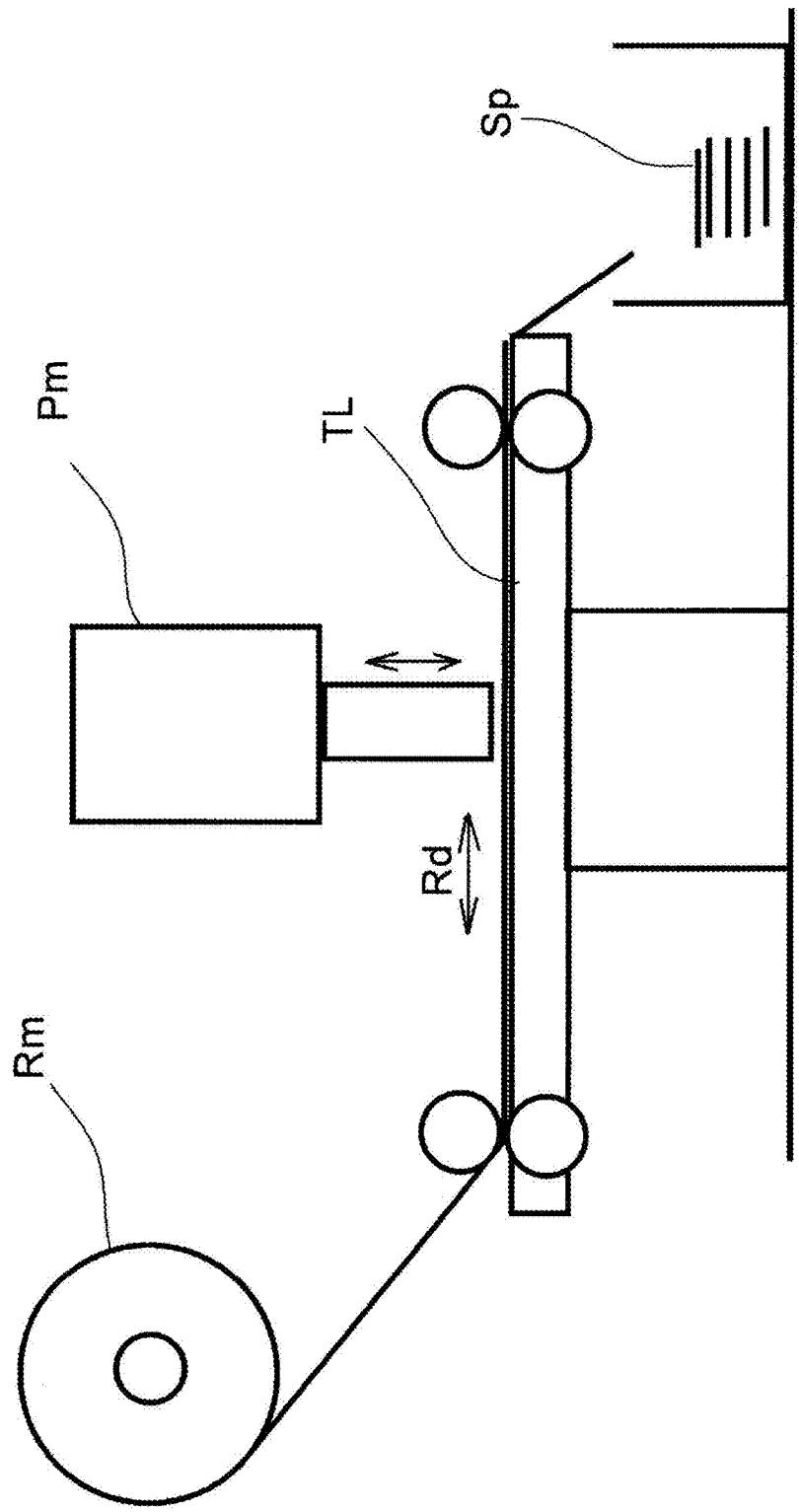
FIG. 13 is a schematic diagram illustrating a process for fabricating, by punching a rolled steel plate material, a steel plate that forms the stator core.

Here, fabrication of the stator core 20 is described. As illustrated in FIG. 13, a material used is a rolled steel plate material Rm that is made by rolling a steel ingot into a strip shape and winding it up in a roll.

The rolled steel plate material Rm has a plate thickness in the range of 0.2 mm to 0.5 mm.

In a punching pressing process, the rolled steel plate material Rm is set, and is progressively fed to a press machine Pm along a conveyance line TL. When the rolled steel plate material Rm is extended from the rolled state into a strip shape, an extension direction of the strip corresponds to a rolling direction Rd.

By the press machine Pm, a steel plate Sp constituting a contour of the stator core 20 is punched out and fabricated in a progressive manner. Subsequently, a plurality of steel plates Sp obtained by punching are laminated and pressurized using a predetermined jig, and are adhered to each other. Accordingly, a single steel plate Sp has a plate thickness in the range of 0.2 mm to 0.5 mm.

Here, according to various factors such as residual stress and residual strain due to the rolling of the rolled steel plate material Rm, and machining precision during punching of the rolled steel plate material Rm from the rolled state into the state of being extended into a strip shape, in the state of the stator core 20 obtained by lamination, as illustrated in FIG. 12, in a direction of a straight line L2, that is, in the rolling direction Rd, an outer diameter dimension tends to be larger than a designed outer diameter dimension D by ΔD. The value of ΔD is in the range of several µm.

Here, as illustrated in FIG. 11 and FIG. 12, the direction (rolling direction Rd) of the straight line L2 is in a position passing through the center of an area on an outer peripheral surface of the annular part 21 where the notches 24 are not provided at equal intervals and orthogonal to the axis S. In other words, the notch 24 is provided in each of positions at an angle θ clockwise from the straight line L2 and at an angle θ counterclockwise from the straight line L2. Accordingly, the rolling direction Rd of the steel plate Sp can be recognized by using a central area Ma between two notches 24 and 24 as an indicator. By putting a mark ML at a central position between the two notches 24 and 24 in the circumferential direction, the mark ML can also be used as an indicator.

The bobbin 30 is formed in a two-piece structure using an electrically insulating resin material, and is assembled so as to sandwich the stator core 20 therebetween in the axis S direction.

The coil 40 employs a concentrated winding structure wound around each of the nine teeth 22 via the bobbin 30, and is divided into three phases and electrically connected.

Figure 10:
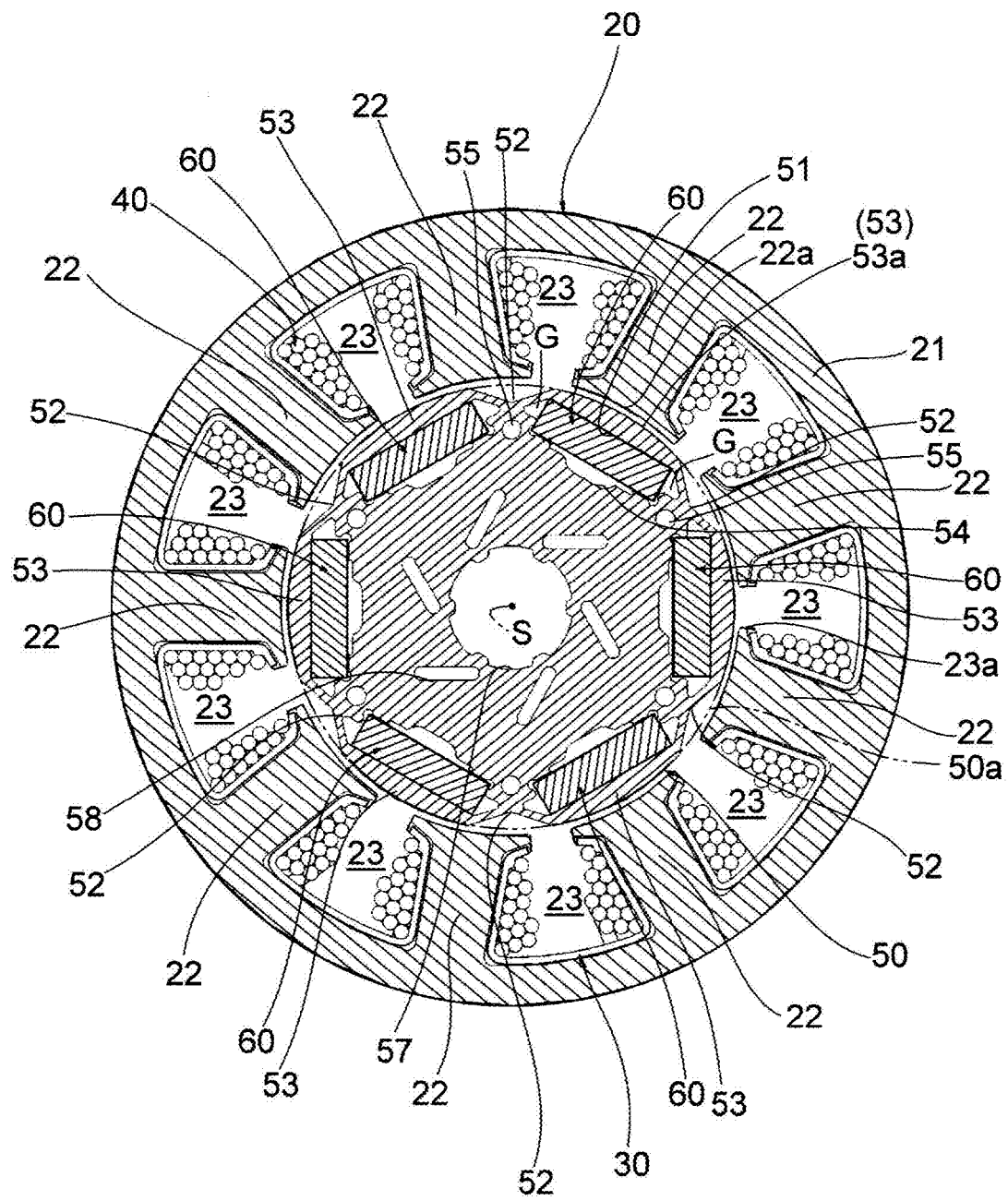
FIG. 10 is a cross-sectional view illustrating an internal structure of the permanent magnet embedded motor illustrated in FIG. 8, taken along a plane perpendicular to an axis.

The rotor core 50 is composed of a laminate of a plurality of steel plates obtained by punching a rolled steel plate material made of a magnetic material. As illustrated in FIG. 10, the rotor core 50 is formed to define the outer peripheral contour 50a of a cylindrical shape that faces the teeth 22 (tip surface 22a) of the stator core 20 with a predetermined gap therebetween.

As illustrated in FIG. 10 and FIG. 14 to FIG. 16, the rotor core 50 includes: six insertion holes 51, arranged at equal intervals in the circumferential direction; six V-groove recesses 52, arranged at equal intervals in the circumferential direction; six outer peripheral magnetic pole parts 53, arranged at equal intervals in the circumferential direction; six filling holes 54, arranged at equal intervals in the circumferential direction; six through holes 55, arranged at equal intervals in the circumferential direction; a receiving part 56, provided corresponding to each insertion hole 51; the shaft hole 57, into which the rotating shaft 5 is fitted; and six long holes 58, arranged at equal intervals in the circumferential direction.

Here, the six insertion holes 51, the six V-groove recesses 52, the six outer peripheral magnetic pole parts 53, the six filling holes 54, the six through holes 55, six receiving parts 56, and the six long holes 58 are respectively formed rotationally symmetrical about the axis S, and are formed line symmetrical with respect to a straight line DL in the radial direction except the long holes 58. Thus, only one of each of them will be described below.

The insertion hole 51 is an area where the permanent magnet 60 is inserted and fixed, that is, an area where the permanent magnet 60 is embedded. As illustrated in FIG. 16, the insertion hole 51 is formed to have a cross-sectional shape long in a vertical direction Pd with respect to the straight line DL in the radial direction of the rotor Rt.

Specifically, the insertion hole 51 is formed to include two wall surfaces 51a and 51b parallel to the vertical direction Pd, and two convex curved surfaces 51c protruding inward away from the through hole 55 at both ends in the vertical direction Pd.

Since the insertion hole 51 includes the two convex curved surfaces 51c, when the permanent magnet 60 is inserted into the insertion hole 51, while a gap G is provided on both sides, the permanent magnet 60 can be suppressed or prevented from shifting in the vertical direction Pd.

The V-groove recess 52 divides the outer peripheral contour 50a in the circumferential direction. In order to define the outer peripheral magnetic pole part 53, the V-groove recess 52 is formed between the insertion holes 51 and 51 in the circumferential direction to provide a gap having a V-groove-shaped cross section tapering toward the axis S.

The V-groove recess 52 functions as a flux barrier that suppresses or prevents leakage and short-circuiting of a line of magnetic force.

The outer peripheral magnetic pole part 53 is an area where a magnetic pole corresponding to the permanent magnet 60 inserted into the insertion hole 51 is generated. As illustrated in FIG. 16, the outer peripheral magnetic pole part 53 is of a shape line symmetrical with respect to the straight line DL in the radial direction, and includes the outer peripheral magnetic pole surface 53a between two V-groove recesses 52 and 52.

The outer peripheral magnetic pole surface 53a is formed in a cylindrical curved surface that defines the outer peripheral contour 50a, that is, a curved surface having a curvature of $2/\varphi Z$ when the outer peripheral contour 50a has an outer diameter dimension of $\varphi Z$. The outer peripheral magnetic pole surface 53a faces the tip surface 22a of the teeth 22 with a predetermined gap therebetween.

The filling hole 54 is an area where an adhesive for fixing the permanent magnet 60 is filled. The filling hole 54 is formed communicating with and radially inside the insertion hole 51.

That is, after the permanent magnet 60 is inserted into the insertion hole 51, by filling the adhesive into the filling hole 54, a surface of the permanent magnet 60 facing radially inward is adhered to the wall surface 51a of the insertion hole 51.

As illustrated in FIG. 16, in a plane perpendicular to the axis S, between the insertion holes 51 and 51 in the circumferential direction and radially inside the V-groove recess 52, the through hole 55 is formed to provide a gap having a circular cross section.

The through hole 55 functions as a flux barrier that suppresses or prevents leakage and short-circuiting of a line of magnetic force, and also acts as a positioning part into which a jig that positions the rotor core 50 is inserted when the permanent magnet 60 is assembled to the insertion hole 51.

Figure 15:
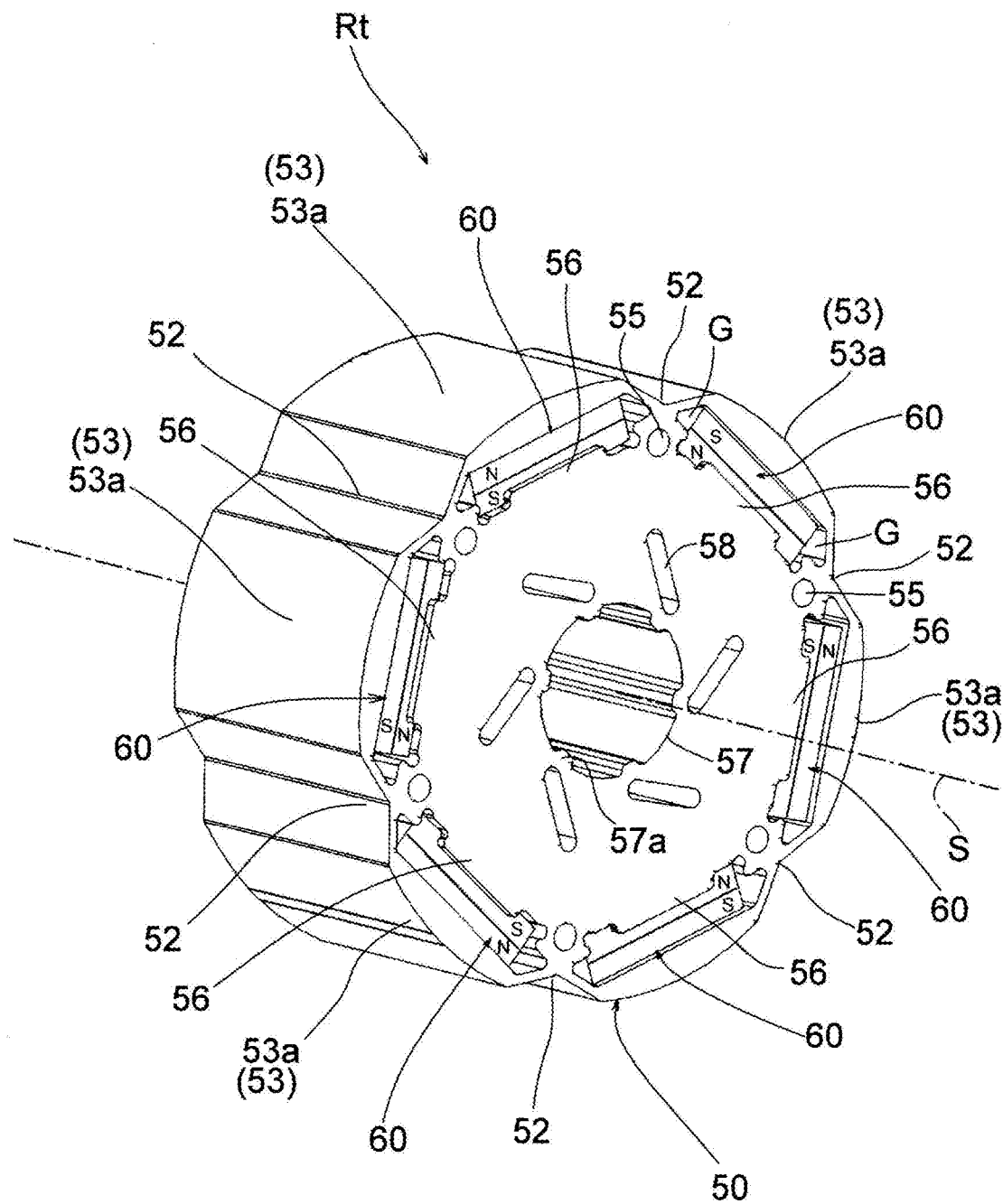
FIG. 15 is an external perspective view of the rotor constituting a portion of the permanent magnet embedded motor illustrated in FIG. 8, as viewed from the other end side.

As illustrated in FIG. 15 and FIG. 16, at the other opening end of the insertion hole 51, the receiving part 56 is formed as a protruding piece protruding inward, receives an end face of the permanent magnet 60 inserted into the insertion hole 51, and positions the permanent magnet 60 in the axis S direction. According to this, simply by inserting the permanent magnet 60 into the insertion hole 51, positioning and adhesion operations are completed.

As illustrated in FIG. 16, the shaft hole 57 fits the rotating shaft 5, and includes six protrusions 57a that are fitted into the key groove 5c of the rotating shaft 5.

The long hole 58 is formed so as to extend in a direction inclined with respect to the straight line DL radially outside the shaft hole 57. The long hole 58 allows elastic deformation of a peripheral area of the protrusion 57a when the rotating shaft 5 is fitted into the shaft hole 57. Accordingly, a fitting operation of the rotating shaft 5 can be smoothly performed.

Figure 14:
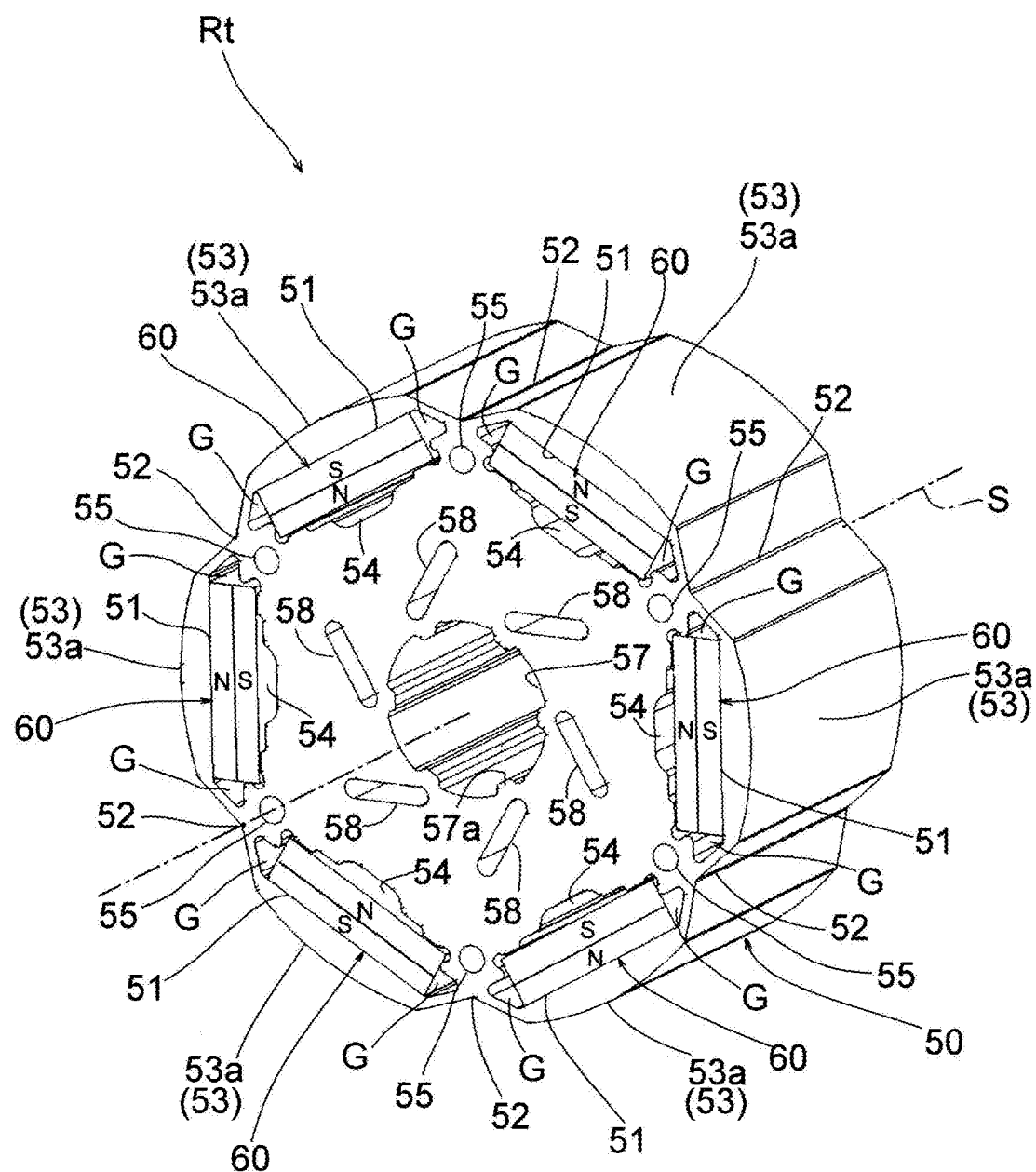
FIG. 14 is an external perspective view of the rotor constituting a portion of the permanent magnet embedded motor illustrated in FIG. 8, as viewed from one end side.

As illustrated in FIG. 10, FIG. 14 and FIG. 15, six permanent magnets 60 are formed in the same shape of a flat plate having a rectangular cross section long in the vertical direction Pd. The six permanent magnets 60 are oriented so that the N pole and the S pole face each other in the radial direction (straight line DL direction) of the rotor core 50, and are inserted at equal intervals in the circumferential direction about the axis S so that the poles facing outward alternate. The permanent magnet 60 is inserted into the insertion hole 51 of the rotor core 50 with the gap G provided on both ends in the vertical direction Pd.

Here, since the gap G is provided on both sides of the permanent magnet 60, it can be prevented that a line of magnetic force short-circuits itself from the N pole to the S pole of the permanent magnet 60.

Since one permanent magnet 60 of a simple flat plate shape is arranged corresponding to one outer peripheral magnetic pole part 53, compared to the configuration in which a permanent magnet of a curved shape is arranged corresponding to one outer peripheral magnetic pole part 53 or the configuration in which a plurality of permanent magnets are arranged corresponding to one outer peripheral magnetic pole part 53, the structure can be simplified and the cost can be reduced.

Figure 18:
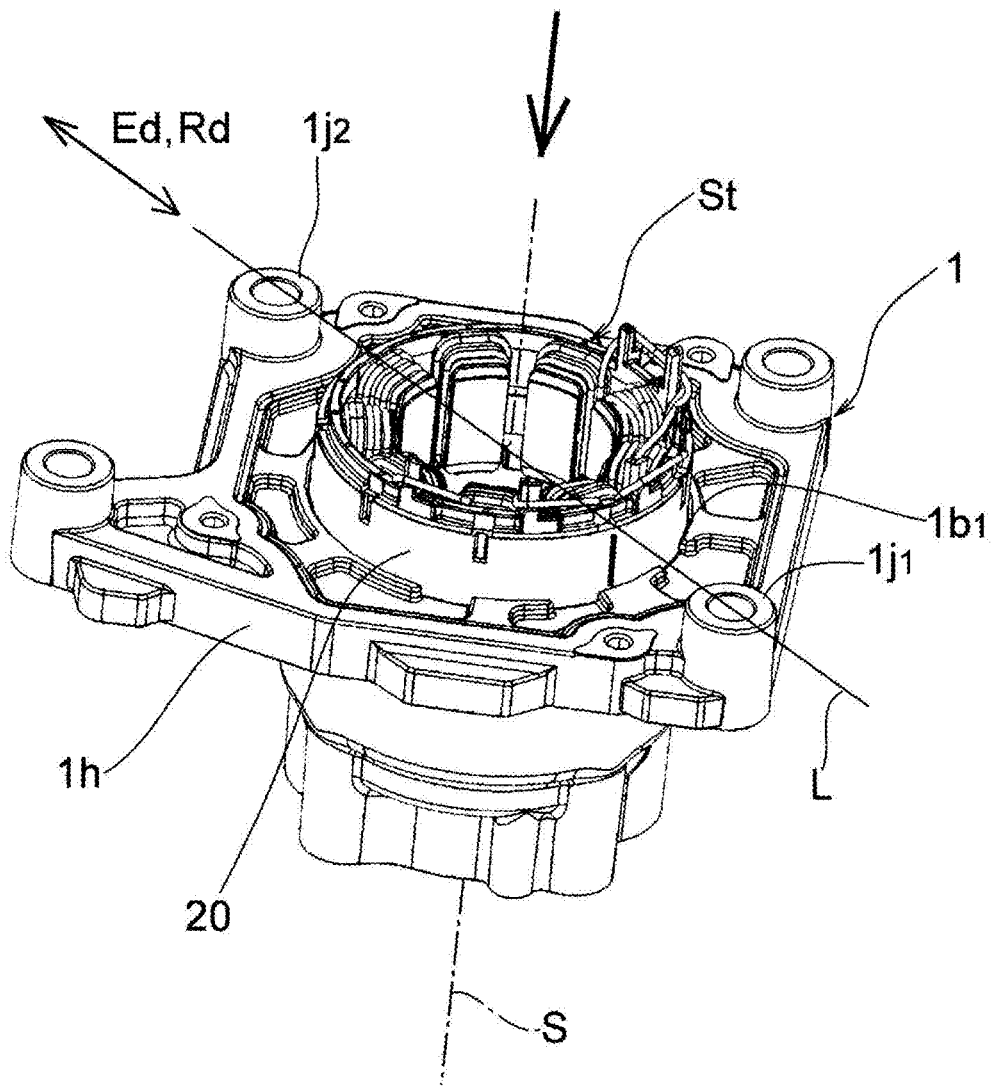
FIG. 18 is a process diagram illustrating a process for heating the housing body constituting a portion of the housing and shrink-fitting the stator into the fitting recess of the housing body.
Figure 19:
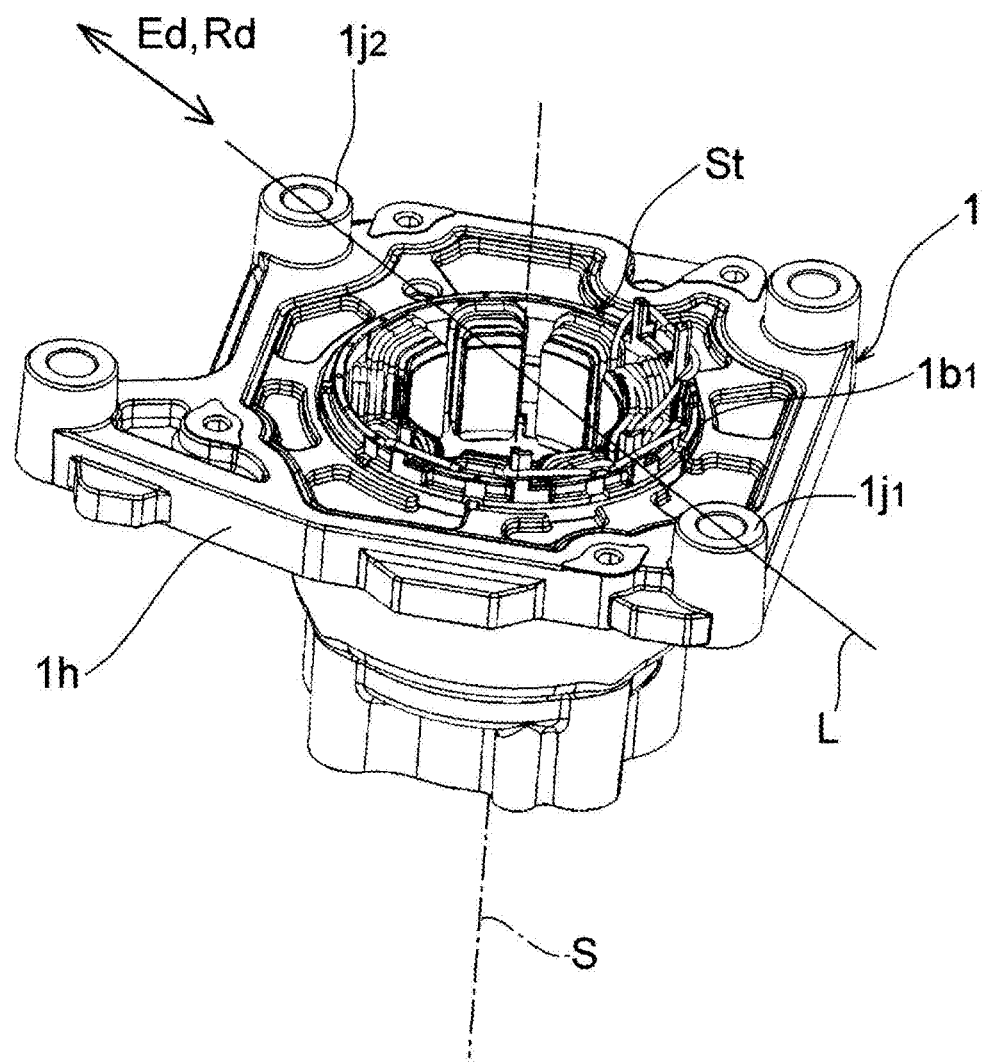
FIG. 19 is a process diagram illustrating a process for heating the housing body constituting a portion of the housing and shrink-fitting the stator into the fitting recess of the housing body.

In the permanent magnet embedded motor M having the above configuration, a fitting operation of the stator St with respect to the housing body 1 will be described with reference to FIG. 17 to FIG. 19.

Figure 17:
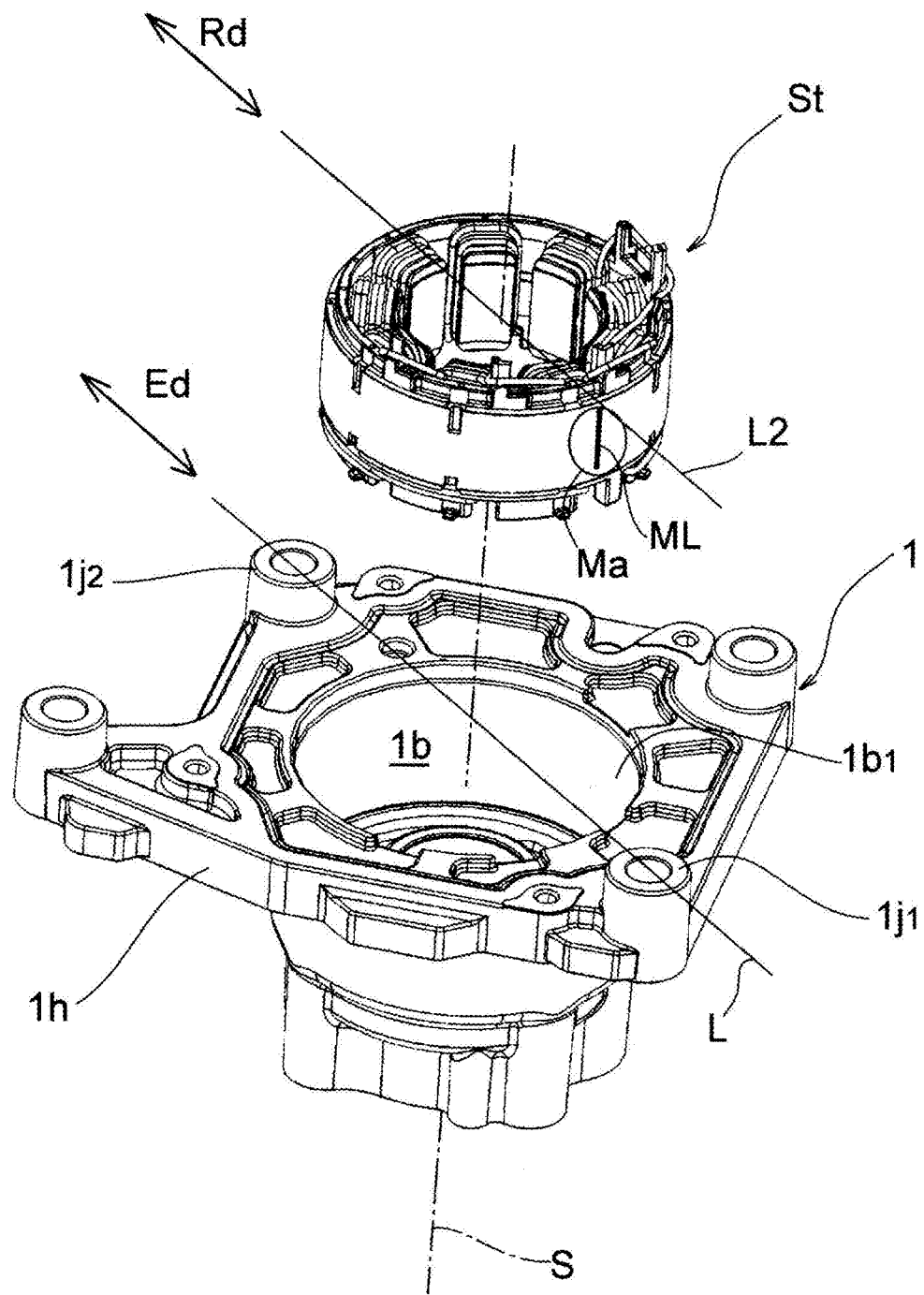
FIG. 17 is a process diagram illustrating a process for heating the housing body constituting a portion of the housing and shrink-fitting a stator into a fitting recess of the housing body.

First, as illustrated in FIG. 17, the housing body 1 and the stator St are prepared. The stator St is formed by fitting the bobbin 30 into the stator core 20 and winding the coil 40 around the bobbin 30.

Here, the rolling direction Rd (straight line L2) of the steel plate Sp constituting the stator core 20 is oriented so as to be aligned with the expansion direction Ed (orthogonal line L direction) of the housing body 1. Preferably, in this orientation, the expansion direction Ed (orthogonal line L) and the rolling direction Rd (straight line L2) completely match each other. However, the present disclosure is not limited thereto. There is some tolerance for misalignment. For example, as illustrated in FIG. 12, a deviation at an angle θ clockwise or counterclockwise with respect to the straight line L2, that is, a deviation in an angular range of 2θ, is tolerable. In this embodiment, the angle θ is about 40°.

Subsequently, the housing body 1 is heated to a predetermined temperature. Thereafter, as illustrated in FIG. 18, the stator core 20 is inserted into the fitting recess 1b in the axis S direction. Then, as illustrated in FIG. 19, the stator St is completely inserted to a predetermined depth into the fitting recess 1b of the housing body 1, and is cooled to room temperature for a predetermined time, by which the stator St is fixed in an interference fit state with respect to the fitting recess 1b.

Figure 20:
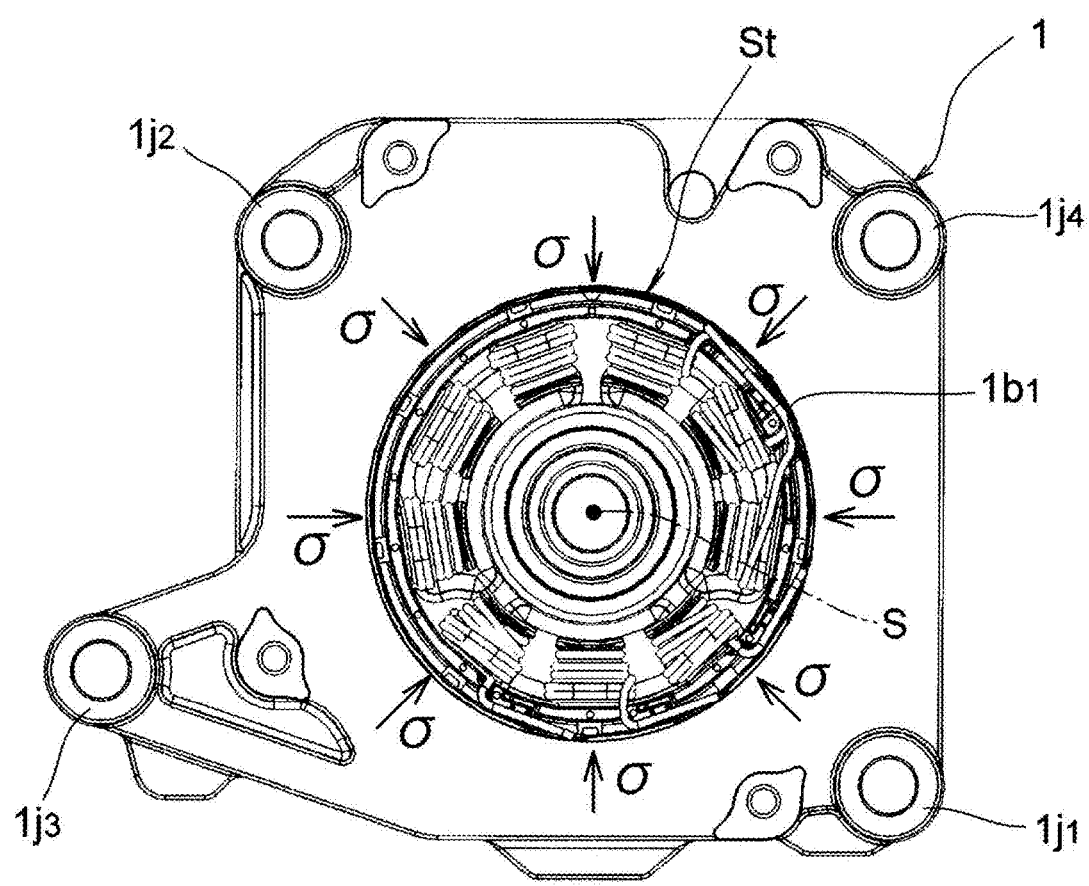
FIG. 20 is a schematic diagram illustrating internal stress occurring around the fitting recess of the housing body in a state after shrink fitting is completed.

As described above, since the stator St is shrink-fitted into the housing body 1 with the rolling direction Rd of the steel plate Sp being oriented in the expansion direction Ed in which the inner diameter of the fitting recess 1b undergoes a large amount of change during heating of the housing body 1 as the housing, as illustrated in FIG. 20, in a state of being cooled to room temperature after shrink fitting, the stator St (stator core 20) has a uniform compressive stress σ acting around the fitting recess 1b from the housing body 1. Accordingly, local stress concentration in the housing body 1 and the stator core 20 can be suppressed or prevented.

As described above, according to the permanent magnet embedded motor M having the above configuration, provided are: the stator St, including the stator core 20 and the coil 40 for excitation, the stator core 20 being formed in an annular shape by laminating a plurality of steel plates Sp obtained by punching the rolled steel plate material Rm; the rotor Rt, arranged inside the stator St and including the permanent magnet 60; and the housing (housing body 1), made of metal and including the fitting recess 1b of a cylindrical shape centered on the predetermined axis S for fitting the stator St therein. The stator St is shrink-fitted into the housing (housing body 1), with the rolling direction Rd of the steel plate Sp being oriented in the expansion direction Ed in which an inner diameter of the fitting recess 1b undergoes a large amount of change during heating of the housing (housing body 1).

According to this, the occurrence of local stress (stress concentration) can be suppressed or prevented without increasing machining costs or increasing complexity and size of the structure of a housing, and a robust structure can be obtained.

In the case where the permanent magnet embedded motor M having the above configuration is applied as a drive source of a pump device, a highly reliable pump device without the risk of damage or the like can be obtained.

An operation of the permanent magnet embedded motor M having the above configuration is similar to that of a conventional permanent magnet embedded motor. Thus, a description thereof will be omitted herein.

In the above embodiment, the flange 1h is formed around the fitting recess 1b. The flange 1h includes the two bosses $1j_1$ and $1j_2$ that are arranged in close proximity to a periphery of the fitting recess 1b and in the orthogonal line L direction orthogonal to the axis S and that are thicker than the wall $1b_2$ defining the fitting recess 1b. The arrangement direction of the two bosses $1j_1$ and $1j_2$ is set as the expansion direction in which an inner diameter of a fitting recess undergoes a large amount of change during heating of the housing. However, the present disclosure is not limited thereto.

Figure 21:
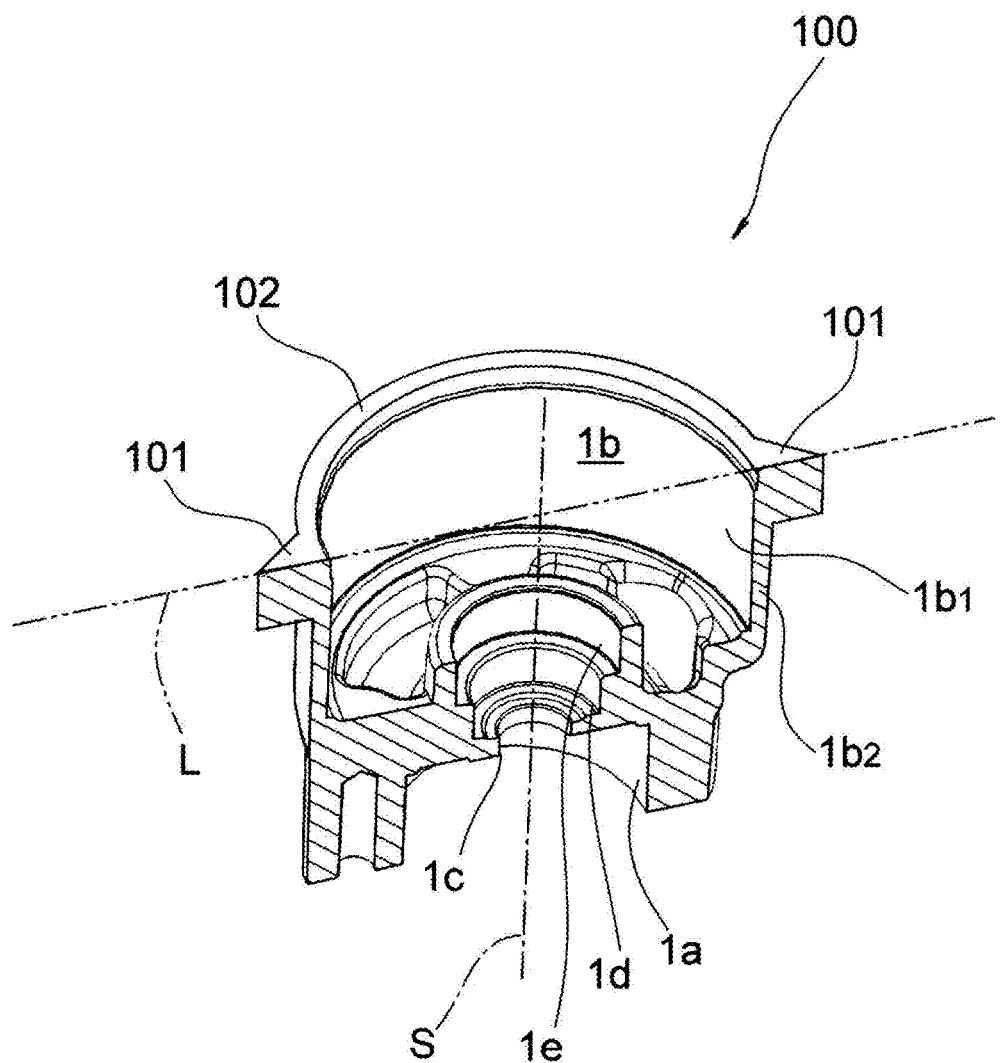
FIG. 21 is a perspective cross-sectional view of the housing body constituting a portion of the housing in a permanent magnet embedded motor according to another embodiment.

For example, as illustrated in FIG. 21, the following configuration may be employed. A housing body 100 constituting a portion of a housing includes: the wall $1b_2$, defining the fitting recess 1b; two thick parts 101, formed continuous with the periphery of the wall $1b_2$ and thicker than the wall $1b_2$ on the opening side of the fitting recess 1b; an opening end face 102, and so on. A motor cover and a board cover (not illustrated) are formed to fit and be fixed to the opening end face 102 of the housing body 100.

Here, the two thick parts 101 are, for example, fitted into a recess of an application object and act to position and fix the housing (housing body 100) at a predetermined position of the application object.

In the above configuration, the expansion direction Ed in which the inner diameter of the fitting recess 1b undergoes a large amount of change during heating of the housing body 100 matches the angular position about the axis S where the cross-sectional area of the thick part 101 is largest in the cross section including the axis S, that is, an angular position of the cross section illustrated in FIG. 21.

In this way, in a configuration including a thick part that is formed continuous with the periphery of the wall $1b_2$ that defines the fitting recess 1b and thicker than the wall $1b_2$, the thick part is not limited to a boss, and may be in other forms.

In short, various other forms can be employed if the thick part has a volume in which an expansion direction in which an inner diameter of a fitting recess undergoes a large amount of change during heating of a housing is specified.

In the above embodiment, as a permanent magnet embedded motor including a stator that includes a plurality of teeth and slots arranged in a circumferential direction and a rotor that includes a plurality of insertion holes arranged in the circumferential direction and a plurality of permanent magnets inserted into each insertion hole, the permanent magnet embedded motor M is shown including the stator St that includes nine teeth 22 and nine slots 23, and the rotor Rt that includes six insertion holes 51 (that is, six permanent magnets 60). That is, in the permanent magnet embedded motor M, the number of magnetic poles of the rotor Rt is six and the number of each of teeth and slots of the stator St is nine.

However, the present disclosure is not limited to the above configuration. The present disclosure can be similarly applied in a permanent magnet embedded motor having any other configuration satisfying the conditions that the number of magnetic poles of the rotor is 2n (n is a natural number) and the number of each of teeth and slots of the stator is 3n (n is a natural number), or specifications that deviate from the above conditions.

In the above embodiment, a case is shown where, in a pump device using the permanent magnet embedded motor M as the drive source, a trochoid pump is employed as the pump unit. However, the present disclosure is not limited thereto. A vane pump or any other type of pump may be employed.

As described above, in the permanent magnet embedded motor of the present disclosure, the occurrence of local stress (stress concentration) can be suppressed or prevented without increasing machining costs or increasing complexity and size of the structure of a housing, and a robust structure can be obtained. Thus, the permanent magnet embedded motor can not only be applied as a drive source of a pump device, but is also useful as a drive source of various devices.

The invention claimed is:

1. A permanent magnet embedded motor, comprising:
a stator, comprising a stator core and a coil for excitation, the stator core being formed in an annular shape by aligning a plurality of steel plates, obtained by punching a rolled steel plate material, so that a rolling direction of each steel plate is oriented in an expansion direction, and laminating the plurality of steel plates obtained by punching a rolled steel plate material;
a rotor, arranged inside the stator and comprising a permanent magnet; and
a housing, made of metal and comprising a fitting recess of a cylindrical shape centered on a predetermined axis for fitting the stator therein, wherein
the stator is shrink-fitted into the housing, with a rolling direction of the steel plate being oriented in an expansion direction in which an inner diameter of the fitting recess undergoes a largest amount of change during heating of the housing.

2. The permanent magnet embedded motor according to claim 1, wherein
the housing comprises a wall and a thicker portion, the wall defining the fitting recess, the thicker portion being formed continuous with a periphery of the wall and thicker than the wall on an opening side of the fitting recess; and
the expansion direction matches an angular position about the axis where a cross-sectional area of the thicker portion is largest in a cross section comprising the axis.

3. The permanent magnet embedded motor according to claim 1, wherein
the housing comprises a wall and two thicker portions, the wall defining the fitting recess, the two thicker portions being formed continuously around the wall in an orthogonal line direction orthogonal to the axis on an opening side of the fitting recess and being thicker than the wall; and
the stator is shrink-fitted into the housing, with the rolling direction being oriented in an arrangement direction of the two thicker portions.

4. The permanent magnet embedded motor according to claim 1, wherein
the housing comprises a wall, a flange, and two bosses, the wall defining the fitting recess, the flange being formed around the wall on an opening side of the fitting recess, the two bosses being arranged at the flange in an orthogonal line direction orthogonal to the axis and being thicker than the wall; and
the stator is shrink-fitted into the housing, with the rolling direction being oriented in an arrangement direction of the two bosses.

5. The permanent magnet embedded motor according to claim 4, wherein
the flange is formed thicker than the wall.

6. The permanent magnet embedded motor according to claim 5, wherein
the two bosses are formed thicker than the flange.

7. The permanent magnet embedded motor according to claim 5, wherein
the flange comprises a plurality of lightening parts in an area outside an area through which the orthogonal line passes.

8. The permanent magnet embedded motor according to claim 1, wherein
the stator comprises an indicator indicating the rolling direction.

9. The permanent magnet embedded motor according to claim 1, wherein
the steel plate has a plate thickness of 0.2 mm to 0.5 mm.

10. The permanent magnet embedded motor according to claim 1, wherein
the housing is made of an aluminum material.

11. The permanent magnet embedded motor according to claim 1, wherein
the stator core comprises teeth and slots arranged in a circumferential direction; and
the stator comprises the coil wound around the teeth via a bobbin made of resin.

12. The permanent magnet embedded motor according to claim 1, wherein
the rotor comprises a rotor core of a columnar shape and the permanent magnets, the rotor core being formed by laminating a plurality of steel plates obtained by punching a rolled steel plate material and comprising insertion holes arranged in a circumferential direction, the permanent magnet being inserted into the insertion holes, respectively.

13. A pump device, comprising:
a pump unit, suctioning and discharging a fluid;
a rotating shaft, connected to the pump unit; and
a drive source, exerting a driving force on the rotating shaft, wherein the drive source is the permanent magnet embedded motor according to claim 12.

14. The pump device according to claim 13, wherein the pump unit is a trochoid pump comprising an inner rotor to which the rotating shaft is connected and an outer rotor engaged with the inner rotor.

\* \* \* \* \*